United States Patent
Garlapati et al.

(10) Patent No.: US 11,496,243 B1
(45) Date of Patent: Nov. 8, 2022

(54) TECHNIQUES FOR MASKING AND UNMASKING CYCLIC REDUNDANCY CHECK BITS FOR EARLY TERMINATION OF DECODING

(71) Applicant: QUALCOMM Incorporated, San Diego, CA (US)

(72) Inventors: Shravan Kumar Reddy Garlapati, San Diego, CA (US); Afshin Haftbaradaran, San Diego, CA (US); Alessandro Risso, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/307,835

(22) Filed: May 4, 2021

(51) Int. Cl.
*H04L 1/00* (2006.01)
*H04W 72/04* (2009.01)
*H04W 76/11* (2018.01)

(52) U.S. Cl.
CPC ......... *H04L 1/0063* (2013.01); *H04W 72/042* (2013.01); *H04W 72/0466* (2013.01); *H04W 76/11* (2018.02)

(58) Field of Classification Search
CPC ... H04L 1/0045; H04L 1/0041; H04L 1/0065; H04L 1/0042; H04L 1/0061; H04L 1/0057; H04L 1/0008; H04L 1/00; H04L 1/0052; H04L 1/0063; H04L 1/005; H04L 1/0054; H03M 13/13; H03M 13/29; H03M 13/09; H03M 13/2906; H04W 28/04
See application file for complete search history.

(56) References Cited

U.S. PATENT DOCUMENTS

| | | | | |
|---|---|---|---|---|
| 2014/0362722 | A1* | 12/2014 | Loehr | H04W 52/365 370/252 |
| 2016/0037524 | A1* | 2/2016 | Krzymien | H04L 1/1812 370/329 |
| 2017/0033901 | A1* | 2/2017 | Tavildar | H04L 45/245 |
| 2018/0270807 | A1* | 9/2018 | Salem | H04W 72/0413 |
| 2018/0331693 | A1 | 11/2018 | Lou et al. | |

(Continued)

FOREIGN PATENT DOCUMENTS

KR 20190029397 A 3/2019

OTHER PUBLICATIONS

International Search Report and Written Opinion—PCT/US2022/071573—ISA/EPO—dated Jul. 22, 2022.

*Primary Examiner* — Jung Liu
(74) *Attorney, Agent, or Firm* — Dalei Dong; Harrity & Harrity, LLP

(57) ABSTRACT

Various aspects of the present disclosure generally relate to wireless communication. In some aspects, a receiving node may determine a cyclic redundancy check (CRC) based at least in part on log-likelihood ratios (LLRs) associated with downlink control information (DCI) received from a transmitting node. The receiving node may perform a full unmasking of the CRC using a radio network temporary identifier (RNTI) based at least in part on a descrambling of the CRC with the RNTI, wherein a number of bits associated with the RNTI is associated with a number of bits associated with the CRC. The receiving node may initiate an early termination of a decoding of the LLRs based at least in part on the full unmasking of the CRC. Numerous other aspects are described.

30 Claims, 15 Drawing Sheets

(56) References Cited

U.S. PATENT DOCUMENTS

| | | | | |
|---|---|---|---|---|
| 2019/0097756 A1* | 3/2019 | Chatterjee | ............ | H04L 1/0041 |
| 2019/0393983 A1* | 12/2019 | Ookubo | ................ | H04L 1/0041 |
| 2019/0394673 A1* | 12/2019 | Hwang | ................ | H04W 28/06 |
| 2020/0014401 A1 | 1/2020 | Ge et al. | | |
| 2020/0204300 A1* | 6/2020 | Hwang | ................ | H03M 13/09 |
| 2020/0351014 A1* | 11/2020 | Takeda | ................. | H04L 1/0045 |
| 2021/0258129 A1* | 8/2021 | Loehr | .................. | H04L 5/0053 |

* cited by examiner

TECHNIQUES FOR MASKING AND UNMASKING CYCLIC REDUNDANCY CHECK BITS FOR EARLY TERMINATION OF DECODING

FIELD OF THE DISCLOSURE

Aspects of the present disclosure generally relate to wireless communication and to techniques and apparatuses for masking and unmasking cyclic redundancy check (CRC) bits for early termination of decoding.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. "Downlink" (or "forward link") refers to the communication link from the base station to the UE, and the "uplink" (or "reverse link") refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a receiving node includes determining a cyclic redundancy check (CRC) based at least in part on log-likelihood ratios (LLRs) associated with downlink control information (DCI) received from a transmitting node; performing a full unmasking of the CRC using a radio network temporary identifier (RNTI) based at least in part on a descrambling of the CRC with the RNTI, wherein a number of bits associated with the RNTI is associated with a number of bits associated with the CRC; and initiating an early termination of a decoding of the LLRs based at least in part on the full unmasking of the CRC.

In some aspects, the CRC is an $\alpha$-bit CRC, and the number of bits associated with the RNTI is $\beta$ bits, where $\alpha$ is equal to $\beta$.

In some aspects, the method includes obtaining the RNTI using an RNTI mapper function that receives an initial RNTI as an input and produces the RNTI as an output, wherein the number of bits associated with the RNTI is greater than a number of bits associated with the initial RNTI.

In some aspects, a most significant number of bits is taken from the initial RNTI and a number of zeros is padded to the most significant number of bits to produce the RNTI.

In some aspects, the most significant number of bits taken from the initial RNTI is $\mu$ bits, and the number of zeros padded to a resulting $\mu$-bit value is $\beta_1$ zeros to produce the RNTI including $\alpha$ bits, where $\mu+\beta_1=\alpha$.

In some aspects, initiating the early termination of the decoding of the LLRs is based at least in part on an occurrence of a first RNTI-unmasked CRC bit, and an occurrence of a first non-RNTI unmasked CRC bit does not permit the early termination of the decoding of the LLRs until the occurrence of the first RNTI-unmasked CRC bit.

In some aspects, the first RNTI-unmasked CRC bit occurs prior to non-RNTI unmasked CRC bits based at least in part on the full unmasking of the CRC.

In some aspects, initiating the early termination of the decoding of the LLRs is based at least in part on the DCI not being associated with the receiving node.

In some aspects, the RNTI is associated with the number of bits associated with the CRC for a purpose of RNTI unmasking of the CRC for a downlink control channel processing, and an initial RNTI is associated with a number of bits that is less than the number of bits associated with the CRC for non-CRC unmasking purposes.

In some aspects, the early termination of the decoding based at least in part on the full unmasking of the CRC reduces a number of decoding cycles, wherein the number of decoding cycles is based at least in part on a rate match size, a code block size, a payload size, and a rate match mode.

In some aspects, a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

In some aspects, the decoding of the LLRs and corresponding hard decision bits is performed serially or progressively using one of turbo decoding, low-density parity-check (LDPC) decoding, or polar decoding.

In some aspects, a method of wireless communication performed by a receiving node includes determining a CRC based at least in part on LLRs associated with DCI received from a transmitting node; performing a partial unmasking of the CRC using an RNTI based at least in part on a descrambling of the CRC with the RNTI, wherein a number of bits associated with the RNTI is associated with a least significant number of bits associated with the CRC; and initiating an early termination of a decoding of the LLRs based at least in part on the partial unmasking of the CRC.

In some aspects, the CRC is an α-bit CRC, the number of bits associated with the RNTI is $\beta_1$ bits, and the least significant number of bits associated with the CRC is $\beta_1$ least significant bits of the α-bit CRC.

In some aspects, initiating the early termination of the decoding of the LLRs is based at least in part on an occurrence of a first RNTI-unmasked CRC bit, and an occurrence of a first non-RNTI unmasked CRC bit does not permit the early termination of the decoding of the LLRs until the occurrence of the first RNTI-unmasked CRC bit.

In some aspects, the first RNTI-unmasked CRC bit occurs prior to the first non-RNTI unmasked CRC bits based at least in part on the partial unmasking of the CRC using the least significant number of bits associated with the CRC.

In some aspects, initiating the early termination of the decoding of the LLRs is based at least in part on the DCI not being associated with the receiving node.

In some aspects, the early termination of the decoding based at least in part on the partial unmasking of the CRC reduces a number of decoding cycles, wherein the number of decoding cycles is based at least in part on a rate match size, a code block size, a payload size, and a rate match mode.

In some aspects, a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

In some aspects, the decoding of the LLRs and corresponding hard decision bits is performed serially or progressively using one of turbo decoding, LDPC decoding, or polar decoding.

In some aspects, a method of wireless communication performed by a transmitting node includes determining a CRC based at least in part on DCI; performing a full masking of the CRC using an RNTI based at least in part on a scrambling of the CRC with the RNTI, wherein a number of bits associated with the RNTI is associated with a number of bits associated with the CRC; and encoding the DCI for transmission to a receiving node based at least in part on the full masking of the CRC.

In some aspects, the CRC is an α-bit CRC, and the number of bits associated with the RNTI is β bits, where α is equal to β.

In some aspects, the method includes obtaining the RNTI using an RNTI mapper function that receives an initial RNTI as an input and produces the RNTI as an output, wherein the number of bits associated with the RNTI is greater than a number of bits associated with the initial RNTI.

In some aspects, a most significant number of bits is taken from the initial RNTI and a number of zeros is padded to the most significant number of bits to produce the RNTI.

In some aspects, the most significant number of bits taken from the initial RNTI is μ bits, and the number of zeros padded to a resulting μ-bit value is $\beta_1$ zeros to produce the RNTI including α bits, where $\mu+\beta_1=\alpha$.

In some aspects, the RNTI is associated with the number of bits associated with the CRC for a purpose of RNTI masking of the CRC for a downlink control channel processing, and an initial RNTI is associated with a number of bits that is less than the number of bits associated with the CRC for non-CRC masking purposes.

In some aspects, the encoding of the DCI is a polar encoding.

In some aspects, a method of wireless communication performed by a transmitting node includes determining a CRC based at least in part on DCI; performing a partial masking of the CRC using an RNTI based at least in part on a scrambling of the CRC with the RNTI, wherein a number of bits associated with the RNTI is associated with a least significant number of bits associated with the CRC; and encoding the DCI for transmission to a receiving node based at least in part on the partial masking of the CRC.

In some aspects, the CRC is an α-bit CRC, the number of bits associated with the RNTI is $\beta_1$ bits, and the least significant number of bits associated with the CRC is $\beta_1$ least significant bits of the α-bit CRC.

In some aspects, the encoding of the DCI is a polar encoding.

In some aspects, a receiving node for wireless communication includes a memory and one or more processors, coupled to the memory, configured to: determine a CRC based at least in part on LLRs associated with DCI received from a transmitting node; perform a full unmasking of the CRC using an RNTI based at least in part on a descrambling of the CRC with the RNTI, wherein a number of bits associated with the RNTI is associated with a number of bits associated with the CRC; and initiate an early termination of a decoding of the LLRs based at least in part on the full unmasking of the CRC.

In some aspects, the CRC is an α-bit CRC, and the number of bits associated with the RNTI is β bits, where α is equal to β.

In some aspects, the one or more processors are further configured to: obtain the RNTI using an RNTI mapper function that receives an initial RNTI as an input and produces the RNTI as an output, wherein the number of bits associated with the RNTI is greater than a number of bits associated with the initial RNTI.

In some aspects, a most significant number of bits is taken from the initial RNTI and a number of zeros is padded to the most significant number of bits to produce the RNTI.

In some aspects, the most significant number of bits taken from the initial RNTI is μ bits, and the number of zeros padded to a resulting μ-bit value is $\rho_1$ zeros to produce the RNTI including α bits, where $\mu+\beta_1=\alpha$.

In some aspects, the one or more processors, when initiating the early termination of the decoding of the LLRs, are configured to initiate the early termination based at least in part on an occurrence of a first RNTI-unmasked CRC bit, and an occurrence of a first non-RNTI unmasked CRC bit does not permit the early termination of the decoding of the LLRs until the occurrence of the first RNTI-unmasked CRC bit.

In some aspects, the first RNTI-unmasked CRC bit occurs prior to non-RNTI unmasked CRC bits based at least in part on the full unmasking of the CRC.

In some aspects, the one or more processors, when initiating the early termination of the decoding of the LLRs, are configured to initiate the early termination based at least in part on the DCI not being associated with the receiving node.

In some aspects, the RNTI is associated with the number of bits associated with the CRC for a purpose of RNTI unmasking of the CRC for a downlink control channel processing, and an initial RNTI is associated with a number of bits that is less than the number of bits associated with the CRC for non-CRC unmasking purposes.

In some aspects, the early termination of the decoding based at least in part on the full unmasking of the CRC reduces a number of decoding cycles, wherein the number of decoding cycles is based at least in part on a rate match size, a code block size, a payload size, and a rate match mode.

In some aspects, a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

In some aspects, the decoding of the LLRs and corresponding hard decision bits is performed serially or progressively using one of turbo decoding, LDPC decoding, or polar decoding.

In some aspects, a receiving node for wireless communication includes a memory and one or more processors, coupled to the memory, configured to: determine a CRC based at least in part on LLRs associated with DCI received from a transmitting node; perform a partial unmasking of the CRC using an RNTI based at least in part on a descrambling of the CRC with the RNTI, wherein a number of bits associated with the RNTI is associated with a least significant number of bits associated with the CRC; and initiate an early termination of a decoding of the LLRs based at least in part on the partial unmasking of the CRC.

In some aspects, the CRC is an $\alpha$-bit CRC, the number of bits associated with the RNTI is $\beta_1$ bits, and the least significant number of bits associated with the CRC is $\beta_1$ least significant bits of the $\alpha$-bit CRC.

In some aspects, the one or more processors, when initiating the early termination of the decoding of the LLRs, are configured to initiate the early termination based at least in part on an occurrence of a first RNTI-unmasked CRC bit, and an occurrence of a first non-RNTI unmasked CRC bit does not permit the early termination of the decoding of the LLRs until the occurrence of the first RNTI-unmasked CRC bit.

In some aspects, the first RNTI-unmasked CRC bit occurs prior to the first non-RNTI unmasked CRC bits based at least in part on the partial unmasking of the CRC using the least significant number of bits associated with the CRC.

In some aspects, the one or more processors, when initiating the early termination of the decoding of the LLRs, are configured to initiate the early termination based at least in part on the DCI not being associated with the receiving node.

In some aspects, the early termination of the decoding based at least in part on the partial unmasking of the CRC reduces a number of decoding cycles, wherein the number of decoding cycles is based at least in part on a rate match size, a code block size, a payload size, and a rate match mode.

In some aspects, a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

In some aspects, the decoding of the LLRs and corresponding hard decision bits is performed serially or progressively using one of turbo decoding, LDPC decoding, or polar decoding.

In some aspects, a transmitting node for wireless communication includes a memory and one or more processors, coupled to the memory, configured to: determine a CRC based at least in part on DCI; perform a full masking of the CRC using an RNTI based at least in part on a scrambling of the CRC with the RNTI, wherein a number of bits associated with the RNTI is associated with a number of bits associated with the CRC; and encode the DCI for transmission to a receiving node based at least in part on the full masking of the CRC.

In some aspects, the CRC is an $\alpha$-bit CRC, and the number of bits associated with the RNTI is $\beta$ bits, where $\alpha$ is equal to $\beta$.

In some aspects, the one or more processors are further configured to: obtain the RNTI using an RNTI mapper function that receives an initial RNTI as an input and produces the RNTI as an output, wherein the number of bits associated with the RNTI is greater than a number of bits associated with the initial RNTI.

In some aspects, a most significant number of bits is taken from the initial RNTI and a number of zeros is padded to the most significant number of bits to produce the RNTI.

In some aspects, the most significant number of bits taken from the initial RNTI is $\mu$ bits, and the number of zeros padded to a resulting $\mu$-bit value is $\beta_1$ zeros to produce the RNTI including $\alpha$ bits, where $\mu+\beta_1=\alpha$.

In some aspects, the RNTI is associated with the number of bits associated with the CRC for a purpose of RNTI masking of the CRC for a downlink control channel processing, and an initial RNTI is associated with a number of bits that is less than the number of bits associated with the CRC for non-CRC masking purposes.

In some aspects, the encoding of the DCI is a polar encoding.

In some aspects, a transmitting node for wireless communication includes a memory and one or more processors, coupled to the memory, configured to: determine a CRC based at least in part on DCI; perform a partial masking of the CRC using an RNTI based at least in part on a scrambling of the CRC with the RNTI, wherein a number of bits associated with the RNTI is associated with a least significant number of bits associated with the CRC; and encode the DCI for transmission to a receiving node based at least in part on the partial masking of the CRC.

In some aspects, the CRC is an $\alpha$-bit CRC, the number of bits associated with the RNTI is $\beta_1$ bits, and the least significant number of bits associated with the CRC is $\beta_1$ least significant bits of the $\alpha$-bit CRC.

In some aspects, the encoding of the DCI is a polar encoding.

In some aspects, a non-transitory computer-readable medium storing a set of instructions for wireless communication includes one or more instructions that, when executed by one or more processors of a receiving node, cause the receiving node to: determine a CRC based at least in part on LLRs associated with DCI received from a transmitting node; perform a full unmasking of the CRC using an RNTI based at least in part on a descrambling of the CRC with the RNTI, wherein a number of bits associated with the RNTI is associated with a number of bits associated with the CRC; and initiate an early termination of a decoding of the LLRs based at least in part on the full unmasking of the CRC.

In some aspects, the CRC is an $\alpha$-bit CRC, and the number of bits associated with the RNTI is $\beta$ bits, where $\alpha$ is equal to $\beta$.

In some aspects, the one or more instructions further cause the receiving node to: obtain the RNTI using an RNTI mapper function that receives an initial RNTI as an input and produces the RNTI as an output, wherein the number of bits associated with the RNTI is greater than a number of bits associated with the initial RNTI.

In some aspects, a most significant number of bits is taken from the initial RNTI and a number of zeros is padded to the most significant number of bits to produce the RNTI.

In some aspects, the most significant number of bits taken from the initial RNTI is $\mu$ bits, and the number of zeros padded to a resulting $\mu$-bit value is $\beta_1$ zeros to produce the RNTI including $\alpha$ bits, where $\mu+\beta_1=\alpha$.

In some aspects, the one or more instructions, to initiate the early termination of the decoding of the LLRs, further cause the receiving node to initiate the early termination based at least in part on an occurrence of a first RNTI-unmasked CRC bit, and an occurrence of a first non-RNTI unmasked CRC bit does not permit the early termination of the decoding of the LLRs until the occurrence of the first RNTI-unmasked CRC bit.

In some aspects, the first RNTI-unmasked CRC bit occurs prior to non-RNTI unmasked CRC bits based at least in part on the full unmasking of the CRC.

In some aspects, the one or more instructions, to initiate the early termination of the decoding of the LLRs, further cause the receiving node to initiate the early termination based at least in part on the DCI not being associated with the receiving node.

In some aspects, the RNTI is associated with the number of bits associated with the CRC for a purpose of RNTI unmasking of the CRC for a downlink control channel processing, and an initial RNTI is associated with a number of bits that is less than the number of bits associated with the CRC for non-CRC unmasking purposes.

In some aspects, the early termination of the decoding based at least in part on the full unmasking of the CRC reduces a number of decoding cycles, wherein the number of decoding cycles is based at least in part on a rate match size, a code block size, a payload size, and a rate match mode.

In some aspects, a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

In some aspects, the decoding of the LLRs and corresponding hard decision bits is performed serially or progressively using one of turbo decoding, LDPC decoding, or polar decoding.

In some aspects, a non-transitory computer-readable medium storing a set of instructions for wireless communication includes one or more instructions that, when executed by one or more processors of a receiving node, cause the receiving node to: determine a CRC based at least in part on LLRs associated with DCI received from a transmitting node; perform a partial unmasking of the CRC using an RNTI based at least in part on a descrambling of the CRC with the RNTI, wherein a number of bits associated with the RNTI is associated with a least significant number of bits associated with the CRC; and initiate an early termination of a decoding of the LLRs based at least in part on the partial unmasking of the CRC.

In some aspects, the CRC is an $\alpha$-bit CRC, the number of bits associated with the RNTI is $\beta_1$ bits, and the least significant number of bits associated with the CRC is $\beta_1$ least significant bits of the $\alpha$-bit CRC.

In some aspects, the one or more instructions, to initiate the early termination of the decoding of the LLRs, further cause the receiving node to initiate the early termination based at least in part on an occurrence of a first RNTI-unmasked CRC bit, and an occurrence of a first non-RNTI unmasked CRC bit does not permit the early termination of the decoding of the LLRs until the occurrence of the first RNTI-unmasked CRC bit.

In some aspects, the first RNTI-unmasked CRC bit occurs prior to the first non-RNTI unmasked CRC bits based at least in part on the partial unmasking of the CRC using the least significant number of bits associated with the CRC.

In some aspects, the one or more instructions, to initiate the early termination of the decoding of the LLRs, further cause the receiving node to initiate the early termination based at least in part on the DCI not being associated with the receiving node.

In some aspects, the early termination of the decoding based at least in part on the partial unmasking of the CRC reduces a number of decoding cycles, wherein the number of decoding cycles is based at least in part on a rate match size, a code block size, a payload size, and a rate match mode.

In some aspects, a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

In some aspects, the decoding of the LLRs and corresponding hard decision bits is performed serially or progressively using one of turbo decoding, LDPC decoding, or polar decoding.

In some aspects, a non-transitory computer-readable medium storing a set of instructions for wireless communication includes one or more instructions that, when executed by one or more processors of a transmitting node, cause the transmitting node to: determine a CRC based at least in part on DCI; perform a full masking of the CRC using an RNTI based at least in part on a scrambling of the CRC with the RNTI, wherein a number of bits associated with the RNTI is associated with a number of bits associated with the CRC; and encode the DCI for transmission to a receiving node based at least in part on the full masking of the CRC.

In some aspects, the CRC is an $\alpha$-bit CRC, and the number of bits associated with the RNTI is $\beta$ bits, where $\alpha$ is equal to $\beta$.

In some aspects, the one or more instructions further cause the transmitting node to: obtain the RNTI using an RNTI mapper function that receives an initial RNTI as an input and produces the RNTI as an output, wherein the number of bits associated with the RNTI is greater than a number of bits associated with the initial RNTI.

In some aspects, a most significant number of bits is taken from the initial RNTI and a number of zeros is padded to the most significant number of bits to produce the RNTI.

In some aspects, the most significant number of bits taken from the initial RNTI is $\mu$ bits, and the number of zeros padded to a resulting $\beta_1$ value is $\beta_1$ zeros to produce the RNTI including $\alpha$ bits, where $\mu+\beta_1=\alpha$.

In some aspects, the RNTI is associated with the number of bits associated with the CRC for a purpose of RNTI masking of the CRC for a downlink control channel processing, and an initial RNTI is associated with a number of bits that is less than the number of bits associated with the CRC for non-CRC masking purposes.

In some aspects, the encoding of the DCI is a polar encoding.

In some aspects, a non-transitory computer-readable medium storing a set of instructions for wireless communication includes one or more instructions that, when executed by one or more processors of a transmitting node, cause the transmitting node to: determine a CRC based at least in part on DCI; perform a partial masking of the CRC using an RNTI based at least in part on a scrambling of the CRC with the RNTI, wherein a number of bits associated with the RNTI is associated with a least significant number of bits associated with the CRC; and encode the DCI for transmission to a receiving node based at least in part on the partial masking of the CRC.

In some aspects, the CRC is an $\alpha$-bit CRC, the number of bits associated with the RNTI is $\beta_1$ bits, and the least significant number of bits associated with the CRC is $\beta_1$ least significant bits of the $\alpha$-bit CRC.

In some aspects, the encoding of the DCI is a polar encoding.

In some aspects, an apparatus for wireless communication includes means for determining a CRC based at least in part on LLRs associated with DCI received from a transmitting node; means for performing a full unmasking of the CRC using an RNTI based at least in part on a descrambling of the CRC with the RNTI, wherein a number of bits associated with the RNTI is associated with a number of bits associated with the CRC; and means for initiating an early termination of a decoding of the LLRs based at least in part on the full unmasking of the CRC.

In some aspects, the CRC is an $\alpha$-bit CRC, and the number of bits associated with the RNTI is $\beta$ bits, where $\alpha$ is equal to $\beta$.

In some aspects, the apparatus includes means for obtaining the RNTI using an RNTI mapper function that receives an initial RNTI as an input and produces the RNTI as an output, wherein the number of bits associated with the RNTI is greater than a number of bits associated with the initial RNTI.

In some aspects, a most significant number of bits is taken from the initial RNTI and a number of zeros is padded to the most significant number of bits to produce the RNTI.

In some aspects, the most significant number of bits taken from the initial RNTI is $\mu$ bits, and the number of zeros padded to a resulting $\mu$-bit value is $\beta_1$ zeros to produce the RNTI including $\alpha$ bits, where $\mu+\beta_1=\alpha$.

In some aspects, initiating the early termination of the decoding of the LLRs is based at least in part on an occurrence of a first RNTI-unmasked CRC bit, and an occurrence of a first non-RNTI unmasked CRC bit does not permit the early termination of the decoding of the LLRs until the occurrence of the first RNTI-unmasked CRC bit.

In some aspects, the first RNTI-unmasked CRC bit occurs prior to non-RNTI unmasked CRC bits based at least in part on the full unmasking of the CRC.

In some aspects, initiating the early termination of the decoding of the LLRs is based at least in part on the DCI not being associated with the receiving node.

In some aspects, the RNTI is associated with the number of bits associated with the CRC for a purpose of RNTI unmasking of the CRC for a downlink control channel processing, and an initial RNTI is associated with a number of bits that is less than the number of bits associated with the CRC for non-CRC unmasking purposes.

In some aspects, the early termination of the decoding based at least in part on the full unmasking of the CRC reduces a number of decoding cycles, wherein the number of decoding cycles is based at least in part on a rate match size, a code block size, a payload size, and a rate match mode.

In some aspects, a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

In some aspects, the decoding of the LLRs and corresponding hard decision bits is performed serially or progressively using one of turbo decoding, LDPC decoding, or polar decoding.

In some aspects, an apparatus for wireless communication includes means for determining a CRC based at least in part on LLRs associated with DCI received from a transmitting node; means for performing a partial unmasking of the CRC using an RNTI based at least in part on a descrambling of the CRC with the RNTI, wherein a number of bits associated with the RNTI is associated with a least significant number of bits associated with the CRC; and means for initiating an early termination of a decoding of the LLRs based at least in part on the partial unmasking of the CRC.

In some aspects, the CRC is an $\alpha$-bit CRC, the number of bits associated with the RNTI is $\beta_1$ bits, and the least significant number of bits associated with the CRC is $\beta_1$ least significant bits of the $\alpha$-bit CRC.

In some aspects, initiating the early termination of the decoding of the LLRs is based at least in part on an occurrence of a first RNTI-unmasked CRC bit, and an occurrence of a first non-RNTI unmasked CRC bit does not permit the early termination of the decoding of the LLRs until the occurrence of the first RNTI-unmasked CRC bit.

In some aspects, the first RNTI-unmasked CRC bit occurs prior to the first non-RNTI unmasked CRC bits based at least in part on the partial unmasking of the CRC using the least significant number of bits associated with the CRC.

In some aspects, initiating the early termination of the decoding of the LLRs is based at least in part on the DCI not being associated with the receiving node.

In some aspects, the early termination of the decoding based at least in part on the partial unmasking of the CRC reduces a number of decoding cycles, wherein the number of decoding cycles is based at least in part on a rate match size, a code block size, a payload size, and a rate match mode.

In some aspects, a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

In some aspects, the decoding of the LLRs and corresponding hard decision bits is performed serially or progressively using one of turbo decoding, LDPC decoding, or polar decoding.

In some aspects, an apparatus for wireless communication includes means for determining a CRC based at least in part on DCI; means for performing a full masking of the CRC using an RNTI based at least in part on a scrambling of the CRC with the RNTI, wherein a number of bits associated with the RNTI is associated with a number of bits associated with the CRC; and means for encoding the DCI for transmission to a receiving node based at least in part on the full masking of the CRC.

In some aspects, the CRC is an $\alpha$-bit CRC, and the number of bits associated with the RNTI is $\beta$ bits, where $\alpha$ is equal to $\beta$.

In some aspects, the apparatus includes means for obtaining the RNTI using an RNTI mapper function that receives an initial RNTI as an input and produces the RNTI as an output, wherein the number of bits associated with the RNTI is greater than a number of bits associated with the initial RNTI.

In some aspects, a most significant number of bits is taken from the initial RNTI and a number of zeros is padded to the most significant number of bits to produce the RNTI.

In some aspects, the most significant number of bits taken from the initial RNTI is $\mu$ bits, and the number of zeros padded to a resulting $\mu$-bit value is $\beta_1$ zeros to produce the RNTI including $\alpha$ bits, where $\mu+\beta_1=\alpha$.

In some aspects, the RNTI is associated with the number of bits associated with the CRC for a purpose of RNTI masking of the CRC for a downlink control channel processing, and an initial RNTI is associated with a number of bits that is less than the number of bits associated with the CRC for non-CRC masking purposes.

In some aspects, the encoding of the DCI is a polar encoding.

In some aspects, an apparatus for wireless communication includes means for determining a CRC based at least in part on DCI; means for performing a partial masking of the CRC using an RNTI based at least in part on a scrambling of the CRC with the RNTI, wherein a number of bits associated with the RNTI is associated with a least significant number of bits associated with the CRC; and means for encoding the DCI for transmission to a receiving node based at least in part on the partial masking of the CRC.

In some aspects, the CRC is an α-bit CRC, the number of bits associated with the RNTI is $\beta_1$ bits, and the least significant number of bits associated with the CRC is $\beta_1$ least significant bits of the α-bit CRC.

In some aspects, the encoding of the DCI is a polar encoding.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
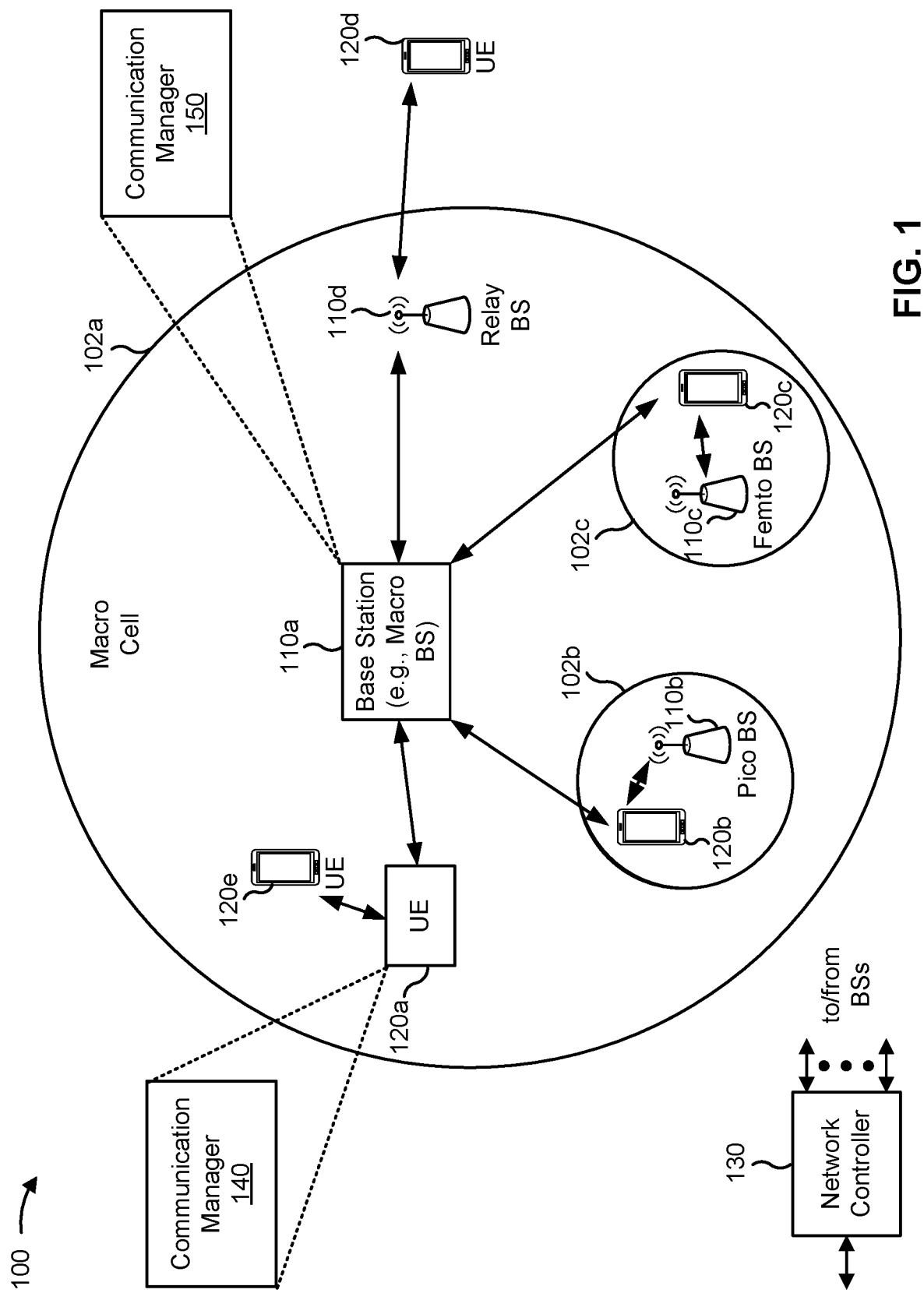
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR base station, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR base station", "gNB", "TRP", "AP", "node B", "5G NB", and "cell" may be used interchangeably herein.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a receiving node (e.g., UE 120) may include a communication manager 140. As described in more detail elsewhere herein, the communication manager 140 may determine a CRC based at least in part on LLRs associated with DCI received from a transmitting node; perform a full unmasking of the CRC using an RNTI based at least in part on a descrambling of the CRC with the RNTI, wherein a number of bits associated with the RNTI is associated with a number of bits associated with the CRC; and initiate an early termination of a decoding of the LLRs based at least in part on the full unmasking of the CRC. Additionally, or alternatively, the communication manager 140 may perform one or more other operations described herein.

In some aspects, a receiving node (e.g., UE 120) may include a communication manager 140. As described in more detail elsewhere herein, the communication manager 140 may determine a CRC based at least in part on LLRs associated with DCI received from a transmitting node; perform a partial unmasking of the CRC using an RNTI based at least in part on a descrambling of the CRC with the RNTI, wherein a number of bits associated with the RNTI is associated with a least significant number of bits associated with the CRC; and initiate an early termination of a decoding of the LLRs based at least in part on the partial unmasking of the CRC. Additionally, or alternatively, the communication manager 140 may perform one or more other operations described herein.

In some aspects, a transmitting node (e.g., base station 110) may include a communication manager 150. As described in more detail elsewhere herein, the communication manager 150 may determine a CRC based at least in part on DCI; perform a full masking of the CRC using an RNTI based at least in part on a scrambling of the CRC with the RNTI, wherein a number of bits associated with the RNTI is associated with a number of bits associated with the CRC; and encode the DCI for transmission to a receiving node based at least in part on the full masking of the CRC. Additionally, or alternatively, the communication manager 150 may perform one or more other operations described herein.

In some aspects, the transmitting node (e.g., base station 110) may include a communication manager 150. As described in more detail elsewhere herein, the communication manager 150 may determine a CRC based at least in part on DCI; perform a partial masking of the CRC using an RNTI based at least in part on a scrambling of the CRC with the RNTI, wherein a number of bits associated with the RNTI is associated with a least significant number of bits associated with the CRC; and encode the DCI for transmission to a receiving node based at least in part on the partial masking of the CRC. Additionally, or alternatively, the communication manager 150 may perform one or more other operations described herein.

As indicated above, FIG. 1 is provided as an example. Other examples may differ from what is described with regard to FIG. 1.

Figure 2:
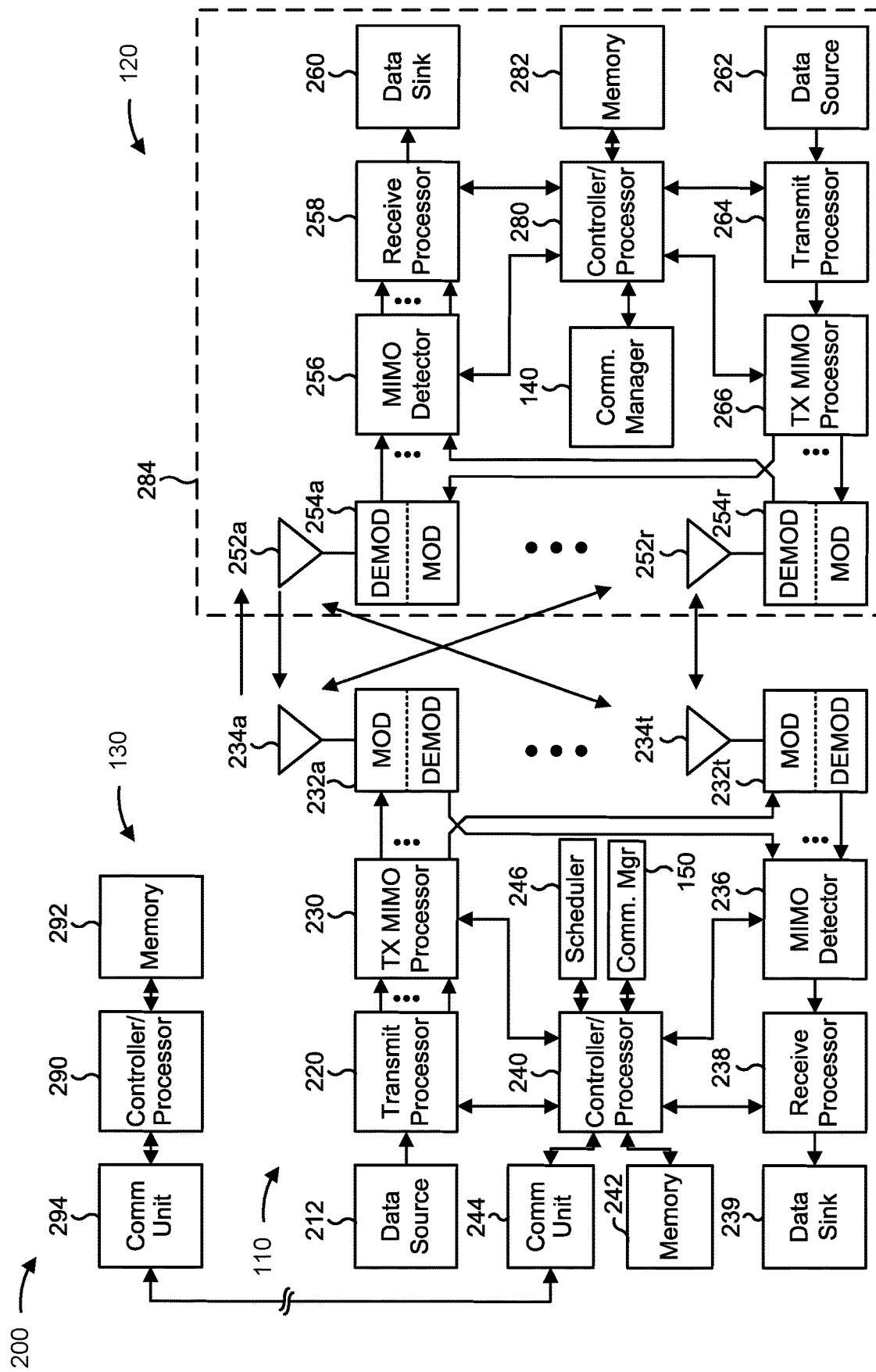
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-13).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-13).

Controller/processor 240 of base station 110, controller/processor 280 of UE 120, and/or any other component(s) of FIG. 2 may perform one or more techniques associated with masking and unmasking CRC bits for early termination of decoding, as described in more detail elsewhere herein. In some aspects, the transmitting node described herein is the base station 110, is included in the base station 110, or includes one or more components of the base station 110 shown in FIG. 2. In some aspects, the receiving node described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions.

In some aspects, a receiving node (e.g., UE 120) includes means for determining a CRC based at least in part on LLRs associated with DCI received from a transmitting node; means for performing a full unmasking of the CRC using an RNTI based at least in part on a descrambling of the CRC with the RNTI, wherein a number of bits associated with the RNTI is associated with a number of bits associated with the CRC; and/or means for initiating an early termination of a decoding of the LLRs based at least in part on the full unmasking of the CRC. In some aspects, the means for the receiving node to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a receiving node (e.g., UE 120) includes means for determining a CRC based at least in part on LLRs associated with DCI received from a transmitting node; means for performing a partial unmasking of the CRC using an RNTI based at least in part on a descrambling of the CRC with the RNTI, wherein a number of bits associated with the RNTI is associated with a least significant number of bits associated with the CRC; and/or means for initiating an early termination of a decoding of the LLRs based at least in part on the partial unmasking of the CRC. In some aspects, the means for the receiving node to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a transmitting node (e.g., base station 110) includes means for determining a CRC based at least in part on DCI; means for performing a full masking of the CRC using an RNTI based at least in part on a scrambling of the CRC with the RNTI, wherein a number of bits associated with the RNTI is associated with a number of bits associated with the CRC; and/or means for encoding the DCI for transmission to a receiving node based at least in part on the full masking of the CRC. In some aspects, the means for the transmitting node to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, a transmitting node (e.g., base station 110) includes means for determining a CRC based at least in part on DCI; means for performing a partial masking of the CRC using an RNTI based at least in part on a scrambling of the CRC with the RNTI, wherein a number of bits associated with the RNTI is associated with a least significant number of bits associated with the CRC; and/or means for encoding the DCI for transmission to a receiving node based at least in part on the partial masking of the CRC. In some aspects, the means for the transmitting node to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

As indicated above, FIG. 2 is provided as an example. Other examples may differ from what is described with regard to FIG. 2.

Figure 3:
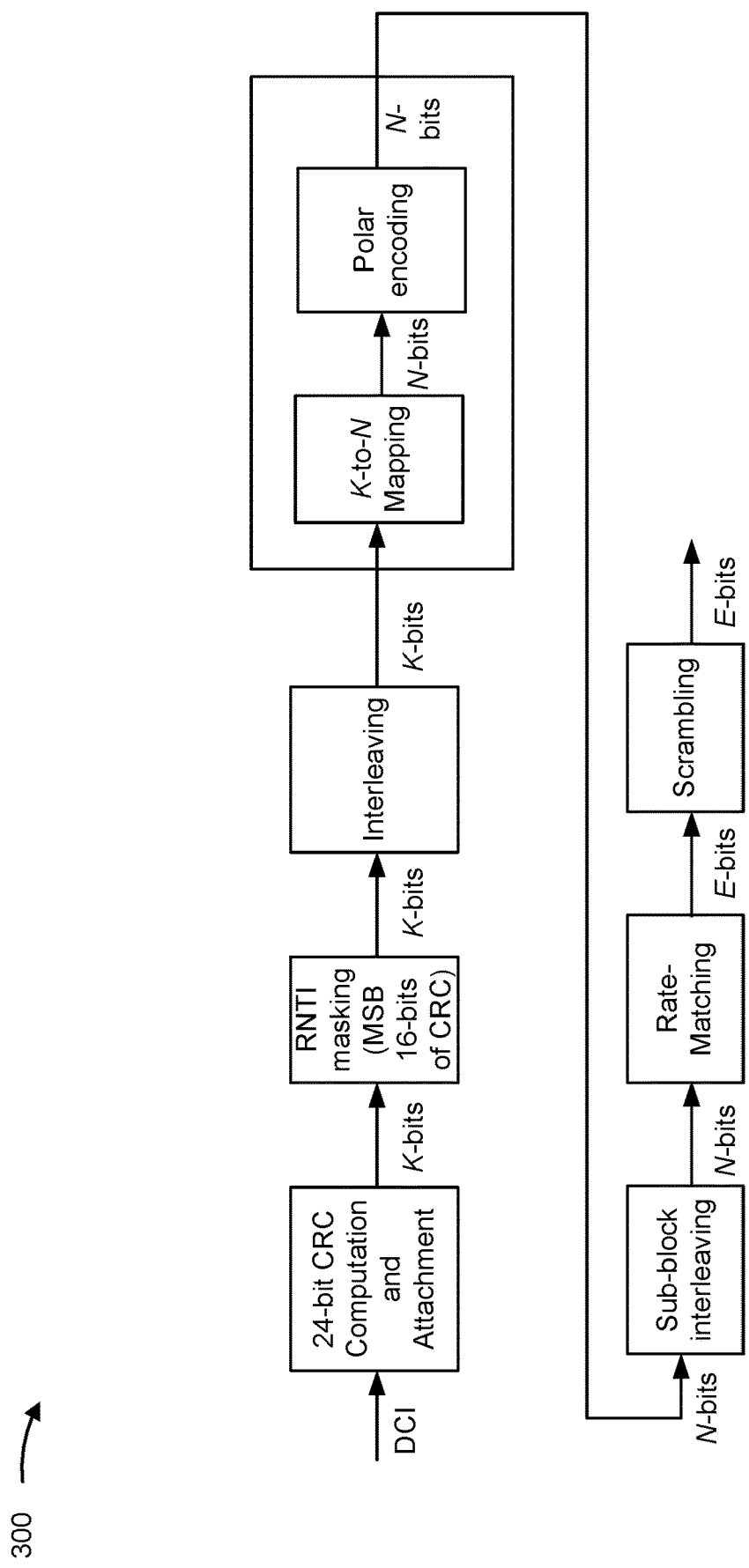
FIG. 3 is a diagram illustrating an example of a transmitting node processing block, in accordance with the present disclosure.

FIG. 3 is a diagram illustrating an example 300 of a transmitting node processing block, in accordance with the present disclosure.

As shown in FIG. 3, at a transmitting node (e.g., an NR physical downlink control channel (PDCCH) transmitting node), DCI bits may undergo multiple stages of processing for transmission in a downlink to a receiving node (e.g., an NR PDCCH receiving node). The DCI bits may undergo a 24-bit CRC computation, an attachment of the 24-bit CRC to the DCI bits, and an RNTI masking, which may result in K bits. An RNTI may be 16 bits, and most significant bit (MSB) 16-bits of the 24-bit CRC may be masked during the RNTI masking. In other words, the RNTI masking may be applied on the MSB 16-bits of the 24-bit CRC. The K bits may include the DCI bits and the 24-bit CRC.

As an example, after the attachment of the 24-bit CRC to the DCI bits, during the RNTI masking, the CRC (or CRC parity bits) may be scrambled with the RNTI $x_{rnti,0}$, $x_{rnti,1}, \ldots, x_{rnti,15}$, where $x_{rnti,0}$ corresponds to the MSB of the RNTI, to form the sequence of bits $c_0, c_1, c_2, c_3, \ldots, c_{K-1}$.

The K bits may be interleaved to produce interleaved K bits. The interleaved K bits may undergo a K-to-N mapping (where N is a code block size) and a polar encoding, which may result in N bits. The N bits may undergo a sub-block interleaving and a rate matching, which may result in E bits. The E bits may undergo a scrambling, and scrambled E bits may be transmitted over-the-air from the transmitting node to the receiving node.

As indicated above, FIG. 3 is provided as an example. Other examples may differ from what is described with regard to FIG. 3.

Figure 4:
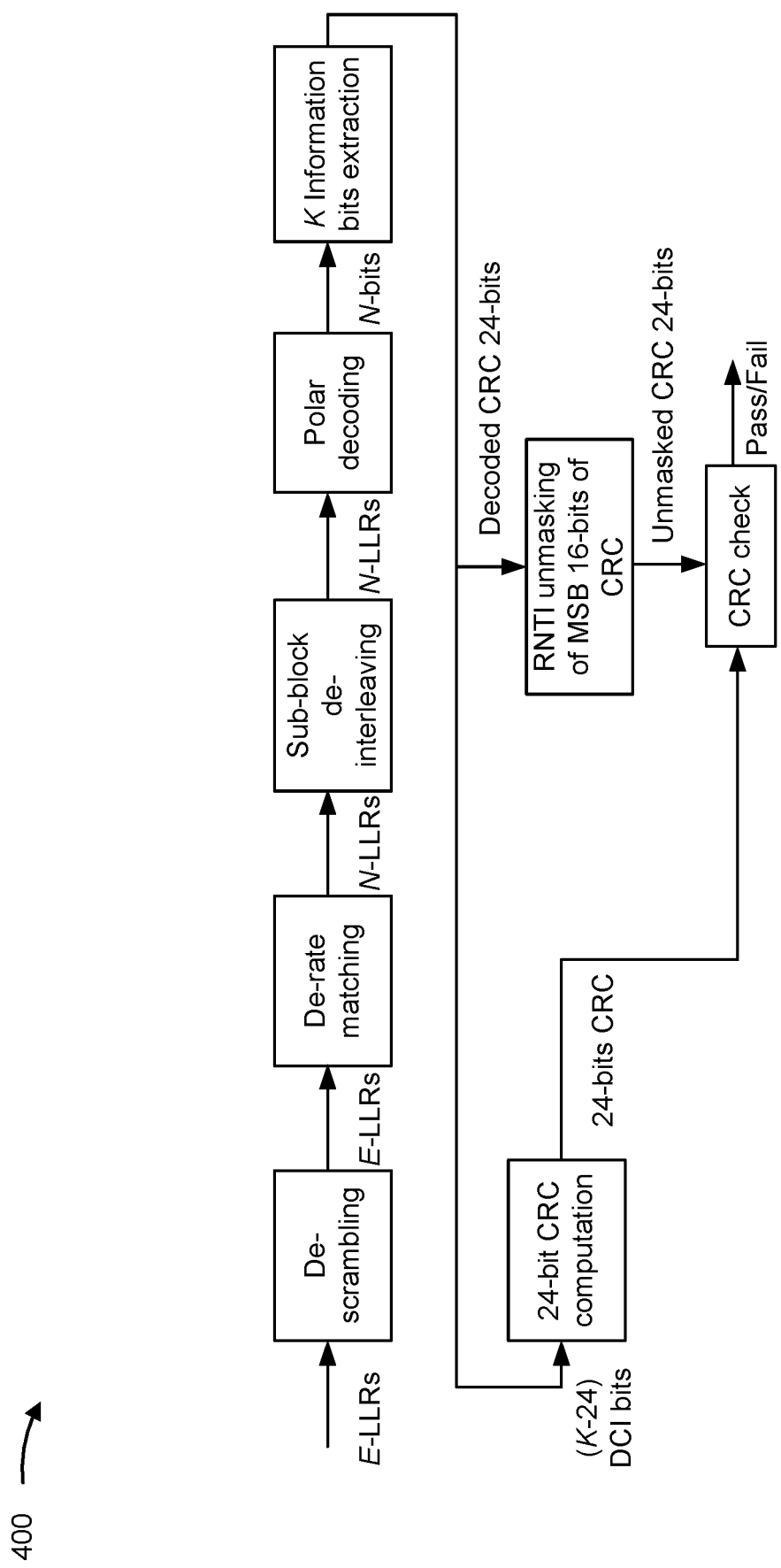
FIG. 4 is a diagram illustrating an example of a first receiving node processing block, in accordance with the present disclosure.

FIG. 4 is a diagram illustrating an example 400 of a first receiving node processing block, in accordance with the present disclosure.

As shown in FIG. 4, in a first receiving node architecture, a receiving node (e.g., an NR PDCCH receiving node) may decode information received from a transmitting node (e.g., an NR PDCCH transmitting node) using multiple stages of processing. The receiving node may receive E-LLRs based at least in part on an over-the-air transmission, and the receiving node may apply descrambling and de-rate matching to the E-LLRs to produce N-LLRs. The receiving node may apply sub-block de-interleaving and polar decoding to the N-LLRs to produce N bits. The polar decoding may involve using short-length polar codes. List-decoding may be employed at the receiving node to achieve a favorable performance. The polar decoding may be performed based at least in part on successive cancelation decoding and information may be decoded progressively. K information bits may be extracted from the N bits to produce (K−24) DCI bits. A 24-bit CRC may be computed based at least in part on the (K−24) DCI bits.

Further, the K information bits extracted from the N bits may produce a decoded 24-bit CRC. The receiving node may perform an RNTI unmasking of MSB 16-bits of the 24-bit CRC to produce an unmasked 24-bit CRC. During the RNTI unmasking, the decoded CRC (or decoded CRC parity bits) may be descrambled with an RNTI to produce the unmasked 24-bit CRC. The receiving node may perform a CRC check by comparing the unmasked 24-bit CRC with the 24-bit CRC (based at least in part on the 24-bit CRC computation using the (K−24) DCI bits), and if the CRC check passes, the receiving node may determine that the information is correctly received from the transmitting node.

In this example, the descrambling, the de-rate matching, the sub-block interleaving, and the polar decoding are performed to obtain a plurality of decoded DCI bits. The 24-bit CRC computation, the RNTI unmasking, and the CRC check may be performed after the plurality of decoded DCI bits (e.g., all decoded DCI bits) are obtained.

As indicated above, FIG. 4 is provided as an example. Other examples may differ from what is described with regard to FIG. 4.

Figure 5:
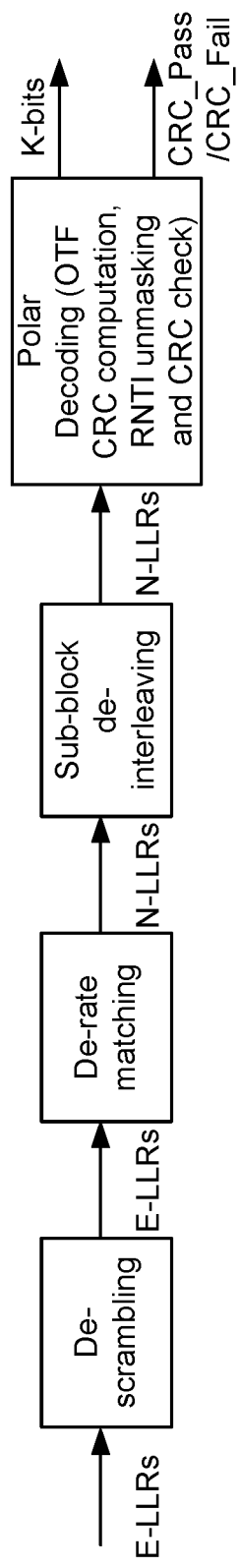
FIG. 5 is a diagram illustrating an example of a second receiving node processing block, in accordance with the present disclosure.

FIG. 5 is a diagram illustrating an example 500 of a second receiving node processing block, in accordance with the present disclosure.

As shown in FIG. 5, in a second receiving node architecture, a receiving node may receive E-LLRs based at least in part on an over-the-air transmission, and the receiving node may apply descrambling and de-rate matching to the E-LLRs to produce N-LLRs, where E may be based at least in part on a rate match size and N may be based at least in part on a code block size. The receiving node may apply sub-block de-interleaving and polar decoding to the N-LLRs. During the polar decoding, the receiving node may perform an on-the-fly (OTF) CRC computation, an RNTI unmasking, and a CRC check. The CRC computation, the RNTI unmasking, and the CRC check may be performed on-the-fly along with the polar decoding in order to save cycles. The CRC computation, the RNTI unmasking, and the CRC check may be performed prior to a plurality of DCI bits being decoded. In other words, the CRC computation, the RNTI unmasking, and the CRC check may be performed progressively as soon as a new DCI bit is decoded and when a decoded DCI bit is a CRC bit.

As indicated above, FIG. 5 is provided as an example. Other examples may differ from what is described with regard to FIG. 5.

An on-the-fly CRC computation, RNTI unmasking, and CRC check may aid in an early termination of polar decoding performed by a receiving node. An interleaver may combine payload bits and parity bits. In order to be eligible for a CRC-based early termination of the polar decoding, the interleaver may be able to, for a plurality of possible sizes (e.g., any possible size) of payload bits, combine the payload bits and CRC (parity) bits in a manner such that each parity bit may only be dependent on payload bits which precede that parity bit. Thus, if a CRC check on the parity bit fails, a remaining decoding operation may be terminated.

At the receiving node, in order to perform the CRC on the parity bit, the parity bit may need to be RNTI unmasked. As the RNTI may only be 16 bits, only 16 MSB bits of the 24 CRC (parity) bits may be RNTI masked at the transmitting node. The 24 CRC bits may be $c_0, c_1, \ldots, c_{23}$, and attaching the 24-bit CRC to DCI bits may result in K bits, which may be $p_0, p_1, \ldots, p_{K-1-24}, c_0, c_1, \ldots, c_{23}$. The CRC (parity) bits may be divided into two groups, which may include non-RNTI masked parity bits (NRMPBs) (e.g., $c_0$ to $c_7$) and RNTI masked parity bits (RMPBs) (e.g., $c_0$ to $c_{23}$). At the transmitting node, after interleaving, a position of a payload and parity bits may be moved. Next, K interleaved bits may be mapped onto an N domain before polar encoding. In this process, K most reliable channels may be selected from N available channels. The K interleaved bits may be placed in the K most reliable channels, and remaining N-K channels may have frozen bits (0s).

In an N-bit output vector of a K-to-N mapping, where N is a code block size, when traversing from bit 0 to N−1, a first parity bit that occurs may be an NRMPB. Further, δ (delta) may be relatively high, where δ may indicate a bit-position difference between an occurrence of a first NRMPB and an occurrence of a first RMPB. A negative value of δ may indicate that the first parity bit that occurs in the N-bit output vector is an RMPB. On the other hand, a positive value of δ may indicate that the first parity bit that occurs in the N-bit output vector is an NRMPB. At the receiving node (e.g., a UE), using RNTI unmasking, the receiving node may detect whether DCI bits are for the receiving node or for another receiving node (e.g., another UE). When δ is positive, a decoder at the receiving node cannot terminate a polar decoding early until the first RMPB is decoded, which may occur δ bit-positions after a first occurrence of the NRMPB. As a result, a 16-bit MSB RNTI masking of CRC bits may result in inefficient early termination of the polar decoding due to a wastage of decoding cycles.

A given category may be associated with a rate match size (E), a code block size (N) (e.g., a PDCCH code block size), a rate match (RM) mode (e.g., puncturing, shortening, or repetition), a K-bit value (which may include a 24-bit CRC), and possible β values. A negative value of β may indicate that a first parity bit that occurs in an N-bit output vector is an RMPB. On the other hand, a positive value of β may indicate that the first parity bit that occurs in the N-bit output vector is an NRMPB. In cases in which α is positive, a 16-bit MSB RNTI masking of CRC bits may result in inefficient early termination of polar decoding due to a wastage of decoding cycles.

In various aspects of techniques and apparatuses described herein, a transmitting node may determine a CRC based at least in part on DCI bits. The transmitting node may perform a masking of the CRC using an RNTI. The masking may be a full masking, where a number of bits associated with the RNTI may be associated with a number of bits associated with the CRC. Alternatively, the masking may be a partial masking, where the number of bits associated with the RNTI may be associated with a least significant number of bits associated with the CRC. The transmitting node may encode the DCI bits for transmission to a receiving node. The receiving node may determine the CRC based at least in part on LLRs associated with the DCI bits received from the transmitting node. The receiving node may perform an unmasking of the CRC using the RNTI. The unmasking may be a full unmasking, or alternatively, the unmasking may be a partial unmasking. The receiving node may initiate an early transmission of a decoding of the LLRs based at least in part on the unmasking of the CRC. In some aspects, the early termination of the decoding may be initiated based at least in part on an occurrence of a first RNTI-unmasked CRC bit, and an occurrence of a first non-RNTI unmasked CRC bit may not permit the early termination of the decoding of the LLRs until the occurrence of the first RNTI-unmasked CRC bit. The first RNTI-unmasked CRC bit may occur prior to non-RNTI unmasked CRC bits based at least in part on the full or partial unmasking of the CRC. In other words, the full or partial unmasking of the CRC may enable a faster early termination of the decoding, as compared to a partial unmasking of the CRC where a number of bits associated with an RNTI may be associated with a most significant number of bits associated with the CRC. As a result, the early termination of the decoding may reduce a number of decoding cycles at the receiving node.

In some aspects, an RNTI masking may be performed on least significant bit (LSB) 16-bits of the 24-bit CRC. In other words, the RNTI masking may be applied on the LSB 16-bits of the 24-bit CRC (e.g., bits $c_0$ to $c_{15}$). The LSB 16-bits of the 24-bit CRC may be masked during the RNTI masking. The RNTI masking may be performed on the LSB 16-bits of the 24-bit CRC instead of the MSB 16-bits of the 24-bit CRC. As a result, early termination of polar decoding may be achieved starting at a first parity bit that is decoded. Polar decoding may be terminated when DCI bits do not belong to the receiving node, thereby resulting in decoding cycle savings.

In some aspects, the decoding may not necessarily be polar decoding, but rather may be a suitable form of bit-by-bit decoding.

In some aspects, when MSB 16-bits of the 24-bit CRC need to be masked, the RNTI masking may utilize a 24-bit masking or a full CRC masking to mask all 24 CRC bits. The 24-bit masking or the full CRC masking may be an alternative to the LSB 16-bits masking.

In some aspects, a 16-bit RNTI may be mapped to a unique 24-bit RNTI using an RNTI mapper function. For the purpose of RNTI masking of CRC for PDCCH processing, the 24-bit RNTI may be used. For other usages of the RNTI, a 16-bit RNTI may be used. In some aspects, the 16-bit RNTI may be converted to the 24-bit RNTI based at least in part on the RNTI mapper function.

In some aspects, the usage of the RNTI mapper function may ensure that an existing RNTI masking of MSB 16-bits of the 24-bit CRC is not changed, and additionally, LSB 8-bits of the 24-bit CRC may be masked using the MSB 8-bits of the 16-bit RNTI.

Figure 6:
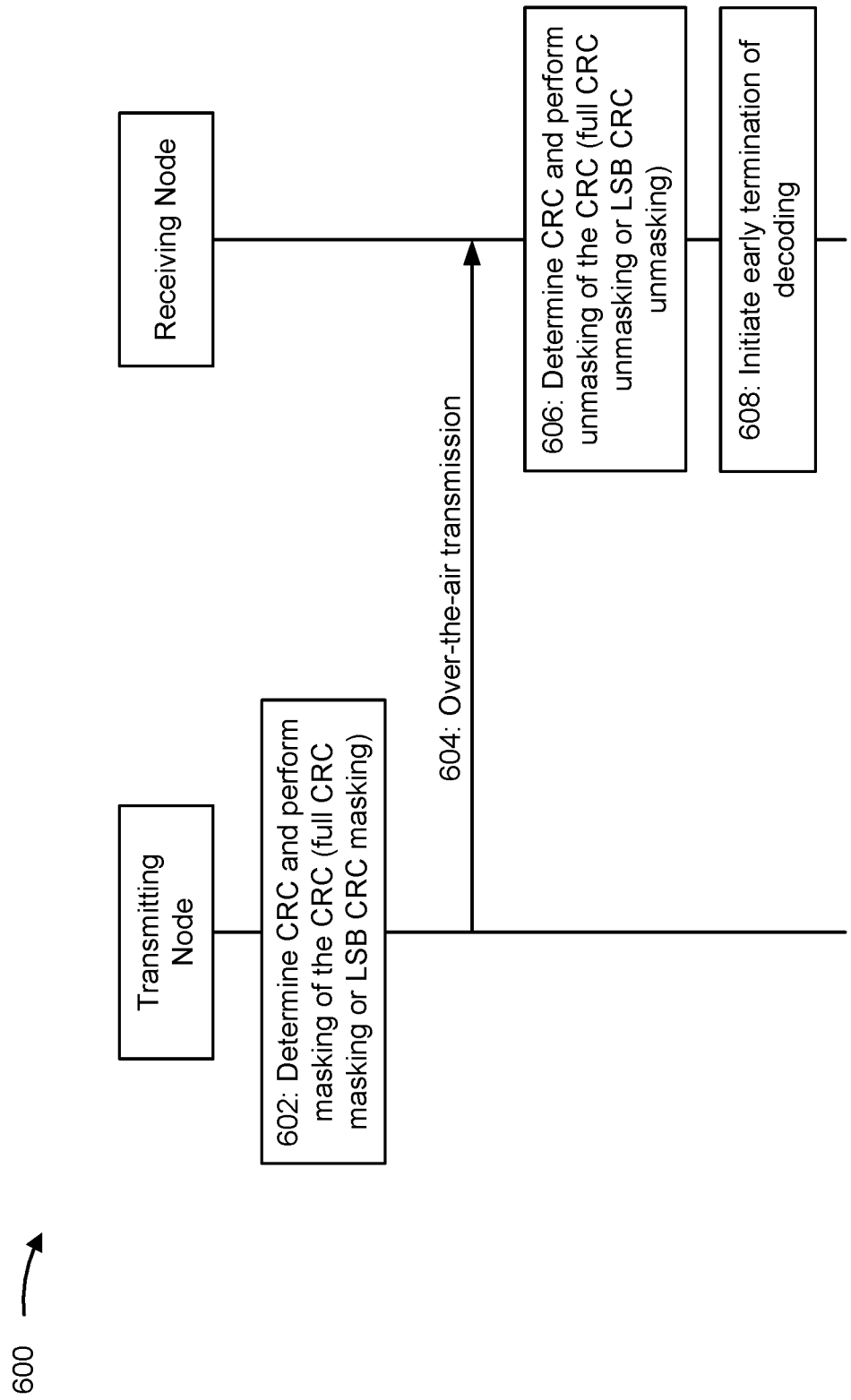
FIG. 6 is a diagram illustrating an example associated with masking and unmasking CRC bits for early termination of decoding, in accordance with the present disclosure.

FIG. 6 is a diagram illustrating an example 600 associated with masking and unmasking CRC bits for early termination of decoding, in accordance with the present disclosure. As shown in FIG. 6, example 600 includes communication between a transmitting node (e.g., base station 110) and a receiving node (e.g., UE 120). In some aspects, the transmitting node and the receiving node may be included in a wireless network such as wireless network 100.

As shown by reference number 602, the transmitting node may determine a CRC based at least in part on DCI bits. The transmitting node may perform a masking of the CRC using an RNTI. The masking of the CRC may be a full masking of the CRC or a partial masking of the CRC, such as an LSB CRC masking.

In some aspects, the transmitting node may perform the full masking of the CRC using the RNTI, where a number of bits associated with the RNTI may be associated with a number of bits associated with the CRC. For example, the CRC may be a 24-bit CRC, and the number of bits associated with the RNTI may be 24 bits. In other words, the RNTI may be a 24-bit RNTI.

In some aspects, the CRC may be an $\alpha$-bit CRC, and the number of bits associated with the RNTI may be $\beta$ bits, where $\alpha$ is equal to $\beta$. For example, the CRC may be a 24-bit CRC, and the number of bits associated with the RNTI may be 24 bits. As another example, the CRC may be a 32-bit CRC, and the number of bits associated with the RNTI may be 32 bits.

In some aspects, the transmitting node may obtain the RNTI using an RNTI mapper function. The RNTI mapper function may receive an initial RNTI as an input and may produce the RNTI as an output. The number of bits associated with the RNTI may be greater than a number of bits associated with the initial RNTI. For example, the initial RNTI may be a 16-bit RNTI, and the RNTI that is outputted may be the 24-bit RNTI. In some aspects, a most significant number of bits may be taken from the initial RNTI, and a number of zeros may be padded to the most significant number of bits to produce the RNTI. For example, MSB 8-bits may be taken from the initial RNTI, and the number of zeros padded to a resulting 8-bit value may be 16 zeros to produce the RNTI including the 24 bits.

In some aspects, MSB bits taken from the initial RNTI may be $\mu$ bits, and the number of zeros padded to a resulting $\mu$-bit value may be $\beta_1$ zeros to produce the RNTI including $\alpha$ bits, where $\mu+\beta_1=\alpha$. As an example, the MSB bits taken from the initial RNTI may be $\beta$ bits, and the number of zeros padded to a resulting 8-bit value may be 16 zeroes to produce an RNTI including 24 bits. As another example, the MSB bits taken from the initial RNTI may be $\beta$ bits, and the number of zeros padded to a resulting 8-bit value may be 24 zeroes to produce an RNTI including 32 bits.

In some aspects, the RNTI may be associated with the number of bits associated with the CRC for a purpose of RNTI masking of the CRC for PDCCH processing. The RNTI may be associated with a number of bits that is less than the number of bits associated with the CRC for non-CRC masking purposes. For example, the 24-bit RNTI may be used for the 24-bit CRC for the purpose of RNTI masking of CRC for PDCCH processing, and a 16-bit RNTI may be used for other purposes.

In some aspects, the transmitting node may perform the partial masking of the CRC using the RNTI, where a number of bits associated with the RNTI may be associated with a least significant number of bits associated with the CRC. For example, the CRC may be a 24-bit CRC, the number of bits associated with the RNTI may be 16 bits, and the least significant number of bits associated with the CRC may be LSB 16-bits of the 24-bit CRC. In this example, RNTI masking may be applied on the LSB 16-bits of the 24-bit CRC, instead of MSB 16-bits of the 24-bit CRC.

In some aspects, the CRC may be an $\alpha$-bit CRC, the number of bits associated with the RNTI may be $\beta_1$ bits, and the least significant number of bits associated with the CRC may be $\beta_1$ least significant bits of the $\alpha$-bit CRC. In one example, $\alpha$ may be 24 and $\beta_1$ may be 16. In another example, $\alpha$ may be 32 and $\beta_1$ may be 24.

In some aspects, the transmitting node may encode the DCI bits for transmission to the receiving node based at least in part on the masking of the CRC using the RNTI (e.g., the full masking of the CRC or the partial masking of the CRC, such as the LSB CRC masking). The encoding of the DCI bits may be a polar encoding.

As shown by reference number 604, the transmitting node may perform an over-the-air transmission of encoded DCI bits to the receiving node. The encoded bits may be derived based at least in part on a 24-bit CRC computation, and an RNTI masking (e.g., a full masking or a partial masking based at least in part on LSB 16-bits of CRC)

As shown by reference number 606, the receiving node may determine a CRC based at least in part on LLRs associated with DCI bits (e.g., the encoded DCI bits) received from the transmitting node. The receiving node may perform an unmasking of the CRC using an RNTI. The unmasking of the CRC may be a full unmasking of the CRC or a partial unmasking of the CRC, such as an LSB CRC unmasking.

In some aspects, the receiving node may perform a full unmasking of the CRC using the RNTI, where a number of bits associated with the RNTI may be associated with a number of bits associated with the CRC. For example, the CRC may be a 24-bit CRC, and the number of bits associated with the RNTI may be 24 bits. In other words, the RNTI may be a 24-bit RNTI.

In some aspects, the receiving node may obtain the RNTI using an RNTI mapper function. The RNTI mapper function may receive an initial RNTI as an input and may produce the RNTI as an output. The number of bits associated with the RNTI may be greater than a number of bits associated with the initial RNTI. For example, the initial RNTI may be a 16-bit RNTI, and the RNTI that is outputted may be the 24-bit RNTI. In some aspects, a most significant number of bits may be taken from the initial RNTI, and a number of zeros may be padded to the most significant number of bits to produce the RNTI. For example, MSB 8-bits may be taken from the initial RNTI, and the number of zeros padded to a resulting 8-bit value may be 16 zeros to produce the RNTI including the 24 bits.

In some aspects, the receiving node may perform the partial unmasking of the CRC using the RNTI, where a number of bits associated with the RNTI may be associated with a least significant number of bits associated with the CRC. For example, the CRC may be a 24-bit CRC, the number of bits associated with the RNTI may be 16 bits, and the least significant number of bits associated with the CRC may be LSB 16-bits of the 24-bit CRC. In this example, RNTI unmasking may be applied on the LSB 16-bits of the 24-bit CRC, instead of MSB 16-bits of the 24-bit CRC.

In some aspects, the receiving node may perform a decoding of the LLRs. The decoding of the LLRs may be a polar decoding. The receiving node may perform a CRC computation, an RNTI unmasking, and a CRC check on-the-fly along with the decoding of the LLRs to reduce decoding cycles as compared to performing the decoding after the CRC computation, the RNTI unmasking, and the CRC check are finished.

As shown by reference number 608, the receiving node may initiate an early termination of the decoding of the LLRs based at least in part on the unmasking of the CRC (e.g., the full unmasking of the CRC or the partial unmasking of the CRC). The early termination of the decoding of the LLRs may be based at least in part on the DCI bits not being associated with the receiving node.

In some aspects, the receiving node may initiate the early termination of the decoding of the LLRs based at least in part on an occurrence of a first RNTI-unmasked CRC bit. An occurrence of a first non-RNTI unmasked CRC bit may not permit the early termination of the decoding of the LLRs until the occurrence of the first RNTI-unmasked CRC bit. The first RNTI-unmasked CRC bit may occur prior to non-RNTI unmasked CRC bits based at least in part on the full unmasking of the CRC, or based at least in part on the partial unmasking of the CRC using the least significant number of bits associated with the CRC. In some aspects, the early termination of the decoding based at least in part on the full or partial unmasking of the CRC may reduce a number of decoding cycles, where the number of decoding cycles may be based at least in part on a rate match size, a code block size, a payload size (e.g., a number of information bits), and a rate match mode.

As indicated above, FIG. 6 is provided as an example. Other examples may differ from what is described with regard to FIG. 6.

Figure 7:
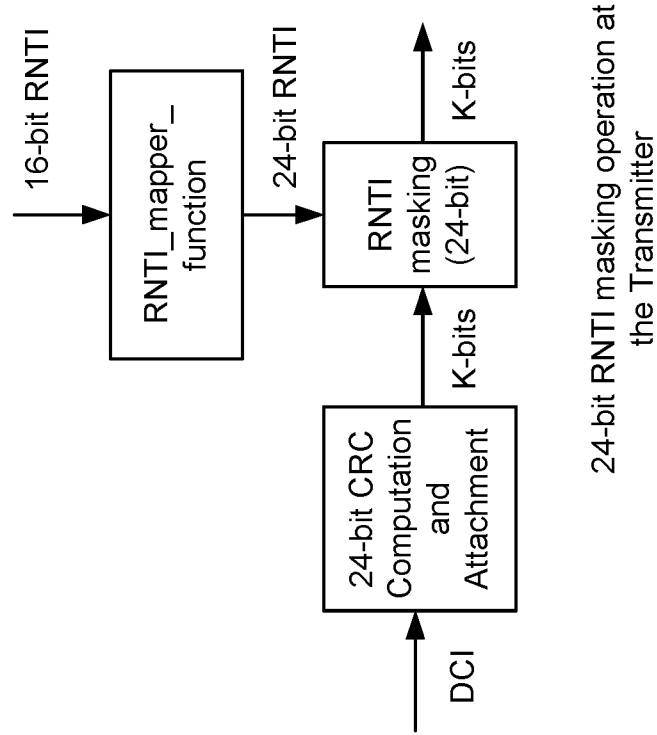
FIG. 7 is a diagram illustrating an example associated with a 24-bit RNTI masking at a transmitting node, in accordance with the present disclosure.

FIG. 7 is a diagram illustrating an example 700 associated with a 24-bit RNTI masking at a transmitting node, in accordance with the present disclosure.

As shown in FIG. 7, the transmitting node may perform a 24-bit CRC computation and attachment using DCI bits, which may result in K bits. A 16-bit RNTI may be inputted into an RNTI mapper function, which may output a 24-bit RNTI. In other words, the RNTI mapper function may convert a 16-bit RNTI to a 24-bit RNTI. Based at least in part on the 24-bit RNTI, the transmitting node may perform a 24-bit RNTI masking (or a full CRC masking) on the K bits. As a result, all 24 bits of the CRC (parity) bits may be RNTI masked at the transmitting node.

As indicated above, FIG. 7 is provided as an example. Other examples may differ from what is described with regard to FIG. 7.

Figure 8:
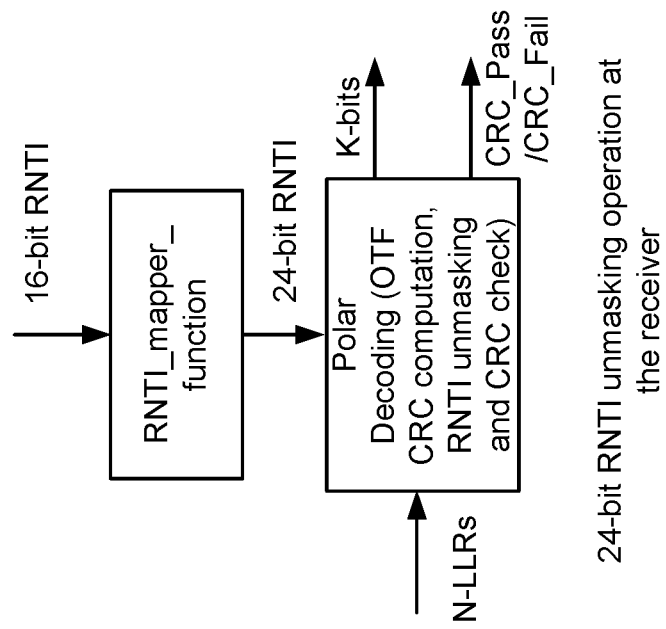
FIG. 8 is a diagram illustrating an example associated with a 24-bit RNTI unmasking at a receiving node, in accordance with the present disclosure.

FIG. 8 is a diagram illustrating an example 800 associated with a 24-bit RNTI unmasking at a receiving node, in accordance with the present disclosure.

As shown in FIG. 8, the receiving node may apply polar decoding to N LLRs. During the polar decoding, the receiving node may perform an on-the-fly CRC computation, an RNTI unmasking, and a CRC check. The CRC computation, the RNTI unmasking, and the CRC check may be performed on-the-fly along with the polar decoding in order to save cycles. Further, a 16-bit RNTI may be inputted into an RNTI mapper function, which may output a 24-bit RNTI. In other words, the RNTI mapper function may convert a 16-bit RNTI to a 24-bit RNTI. Based at least in part on the 24-bit RNTI, the receiving node may perform a 24-bit RNTI unmasking (or a full CRC unmasking) using all 24 bits of the CRC (parity) bits, and the receiving node may perform a CRC check based at least in part on the 24-bit RNTI unmasking.

As indicated above, FIG. 8 is provided as an example. Other examples may differ from what is described with regard to FIG. 8.

Figure 9:
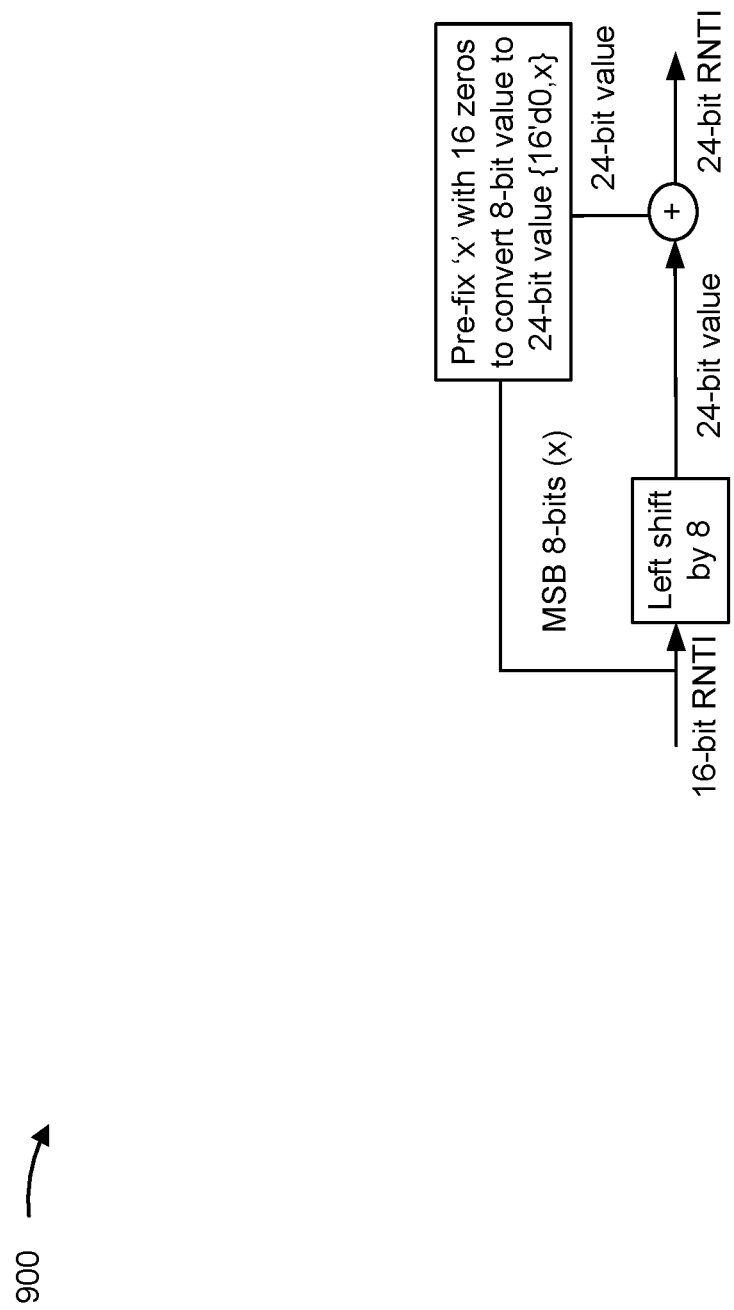
FIG. 9 is a diagram illustrating an example associated with a 16-bit to 24-bit RNTI mapper function, in accordance with the present disclosure.

FIG. 9 is a diagram illustrating an example 900 associated with a 16-bit to 24-bit RNTI mapper function, in accordance with the present disclosure.

As shown in FIG. 9, the 16-bit to 24-bit RNTI mapper function, which may be included in both a transmitting node and a receiving node, may receive a 16-bit RNTI. The 16-bit to 24-bit RNTI mapper function may perform a left shift by eight on the 16-bit RNTI to produce a first 24-bit value. The 16-bit to 24-bit RNTI mapper function may determine, from the 16-bit RNTI, an MSB 8-bits (x), where x may be prefixed with 16 zeros to convert an 8-bit value to a second 24-bit value. A 24-bit RNTI may be outputted based at least in part on the first 24-bit value and the second 24-bit value. In this example, an existing RNTI masking of MSB 16-bits of a 24-bit CRC may not be changed, and additionally, LSB 8-bits of the 24-bit CRC may be masked using MSB 8-bits of the 16-bit RNTI. The 24-bit RNTI may be provided to the transmitting node to perform a 24-bit RNTI masking operation, or to the receiving node to perform a 24-bit RNTI unmasking operation.

As indicated above, FIG. 9 is provided as an example. Other examples may differ from what is described with regard to FIG. 9.

In some aspects, for a PDCCH, a number of cycles taken to decode a code block may depend on values of N, K, and a rate match mode (e.g., puncturing, shortening, or repetition). As a result, a number of cycles saved by implementing a full CRC (24-bit) masking or an LSB 16-bit CRC masking of DCI, which may improve an early termination of polar decoding, may also depend on the values of N, K, and the rate match mode.

In some aspects, depending on a combination of N, K, and a rate match mode, implementing a full CRC (24-bit) masking or an LSB 16-bit CRC masking may save a number of polar decoding cycles at a receiving node. A code block type may be associated with a combination of N, K, and a rate match mode. The code block type may be associated with a number of code blocks. The code block type may be associated with a first number of decoding cycles, where a code block may be early terminated based at least in part on a traditional implementation of a 16-bit RNTI masking. The code block type may be associated with a second number of decoding cycles, where a code block may be early terminated based at least in part on a new implementation of the full CRC (24-bit) masking or the LSB 16-bit CRC masking. For each code block type, the second number of decoding cycles may be less than the first number of decoding cycles, thereby indicating that the new implementation of the full CRC (24-bit) masking using a 24-bit RNTI or the LSB 16-bit CRC masking using a 16-bit RNTI may result in decoding cycle savings for the different types of code blocks.

Figure 10:
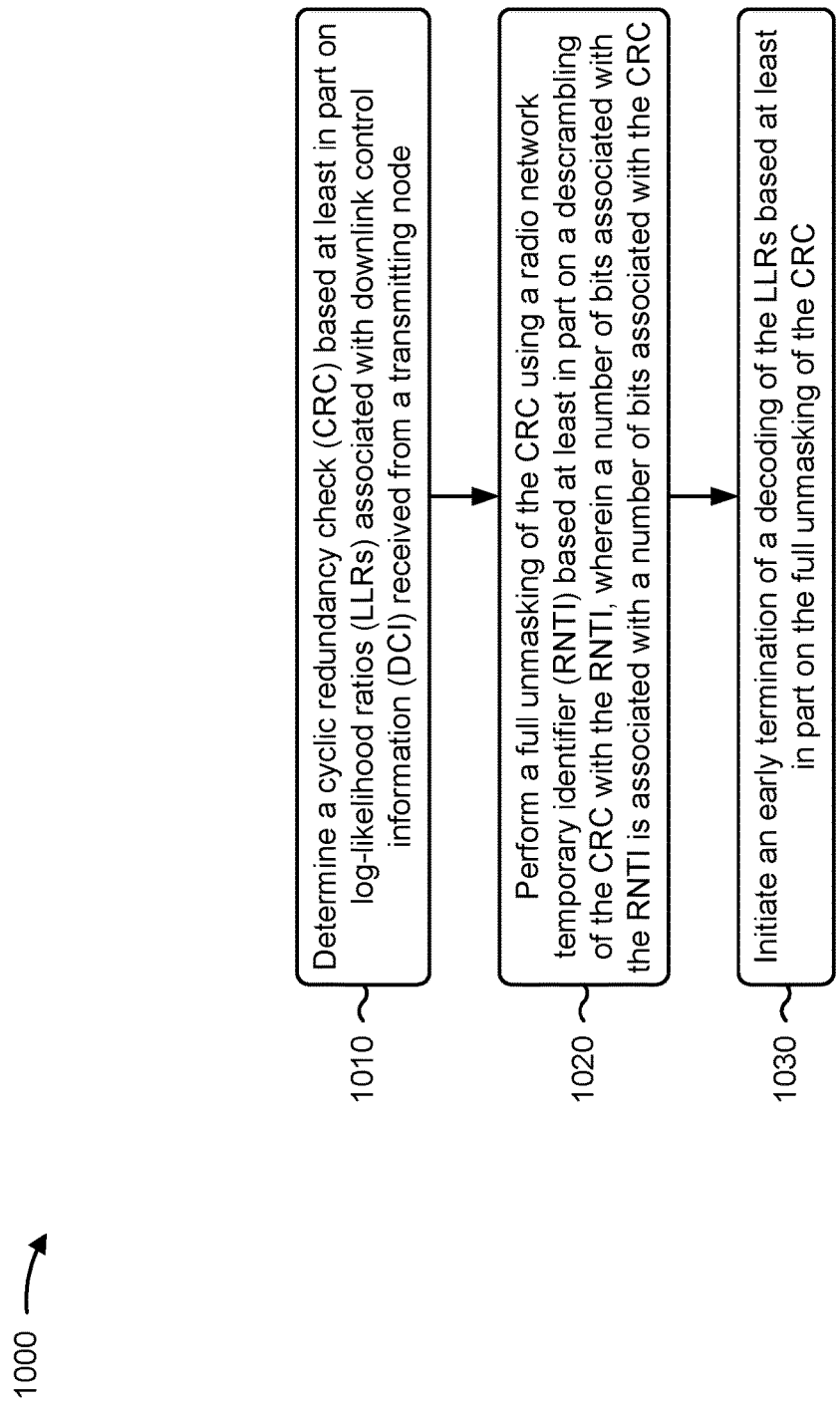
FIGS. 10-13 are diagrams illustrating example processes associated with masking and unmasking CRC bits for early termination of decoding, in accordance with the present disclosure.

FIG. 10 is a diagram illustrating an example process 1000 performed, for example, by a receiving node, in accordance with the present disclosure. Example process 1000 is an example where the receiving node (e.g., UE 120) performs operations associated with techniques for masking and unmasking CRC bits for early termination of decoding.

As shown in FIG. 10, in some aspects, process 1000 may include determining a CRC based at least in part on LLRs associated with DCI received from a transmitting node (block 1010). For example, the receiving node (e.g., using communication manager 140 and/or determination component 1408, depicted in FIG. 14) may determine a CRC based at least in part on LLRs associated with DCI received from a transmitting node, as described above.

As further shown in FIG. 10, in some aspects, process 1000 may include performing a full unmasking of the CRC using an RNTI based at least in part on a descrambling of the CRC with the RNTI, wherein a number of bits associated with the RNTI is associated with a number of bits associated with the CRC (block 1020). For example, the receiving node (e.g., using communication manager 140 and/or performance component 1410, depicted in FIG. 14) may perform a full unmasking of the CRC using an RNTI based at least in part on a descrambling of the CRC with the RNTI, wherein a number of bits associated with the RNTI is associated with a number of bits associated with the CRC, as described above.

As further shown in FIG. 10, in some aspects, process 1000 may include initiating an early termination of a decoding of the LLRs based at least in part on the full unmasking of the CRC (block 1030). For example, the receiving node (e.g., using communication manager 140 and/or initiation component 1412, depicted in FIG. 14) may initiate an early termination of a decoding of the LLRs based at least in part on the full unmasking of the CRC, as described above.

Process 1000 may include additional aspects, such as any single aspect or any combination of aspects described below and/or in connection with one or more other processes described elsewhere herein.

In a first aspect, the CRC is an $\alpha$-bit CRC, and the number of bits associated with the RNTI is $\beta$ bits, where $\alpha$ is equal to $\beta$.

In a second aspect, alone or in combination with the first aspect, process 1000 includes obtaining the RNTI using an RNTI mapper function that receives an initial RNTI as an input and produces the RNTI as an output, wherein the number of bits associated with the RNTI is greater than a number of bits associated with the initial RNTI.

In a third aspect, alone or in combination with one or more of the first and second aspects, a most significant number of bits is taken from the initial RNTI and a number of zeros is padded to the most significant number of bits to produce the RNTI.

In a fourth aspect, alone or in combination with one or more of the first through third aspects, the most significant number of bits taken from the initial RNTI is $\mu$ bits, and the number of zeros padded to a resulting $\mu$-bit value is $\beta_1$ zeros to produce the RNTI including $\alpha$ bits, where $\mu+\beta_1=\alpha$.

In a fifth aspect, alone or in combination with one or more of the first through fourth aspects, initiating the early termination of the decoding of the LLRs is based at least in part on an occurrence of a first RNTI-unmasked CRC bit, and an occurrence of a first non-RNTI unmasked CRC bit does not permit the early termination of the decoding of the LLRs until the occurrence of the first RNTI-unmasked CRC bit.

In a sixth aspect, alone or in combination with one or more of the first through fifth aspects, the first RNTI-unmasked CRC bit occurs prior to non-RNTI unmasked CRC bits based at least in part on the full unmasking of the CRC.

In a seventh aspect, alone or in combination with one or more of the first through sixth aspects, initiating the early termination of the decoding of the LLRs is based at least in part on the DCI not being associated with the receiving node.

In an eighth aspect, alone or in combination with one or more of the first through seventh aspects, the RNTI is associated with the number of bits associated with the CRC for a purpose of RNTI unmasking of the CRC for a downlink control channel processing, and an initial RNTI is associated with a number of bits that is less than the number of bits associated with the CRC for non-CRC unmasking purposes.

In a ninth aspect, alone or in combination with one or more of the first through eighth aspects, the early termination of the decoding based at least in part on the full unmasking of the CRC reduces a number of decoding cycles, wherein the number of decoding cycles is based at least in part on a rate match size, a code block size, a payload size, and a rate match mode.

In a tenth aspect, alone or in combination with one or more of the first through ninth aspects, a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

In an eleventh aspect, alone or in combination with one or more of the first through tenth aspects, the decoding of the LLRs and corresponding hard decision bits is performed serially or progressively using one of turbo decoding, LDPC decoding, or polar decoding.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
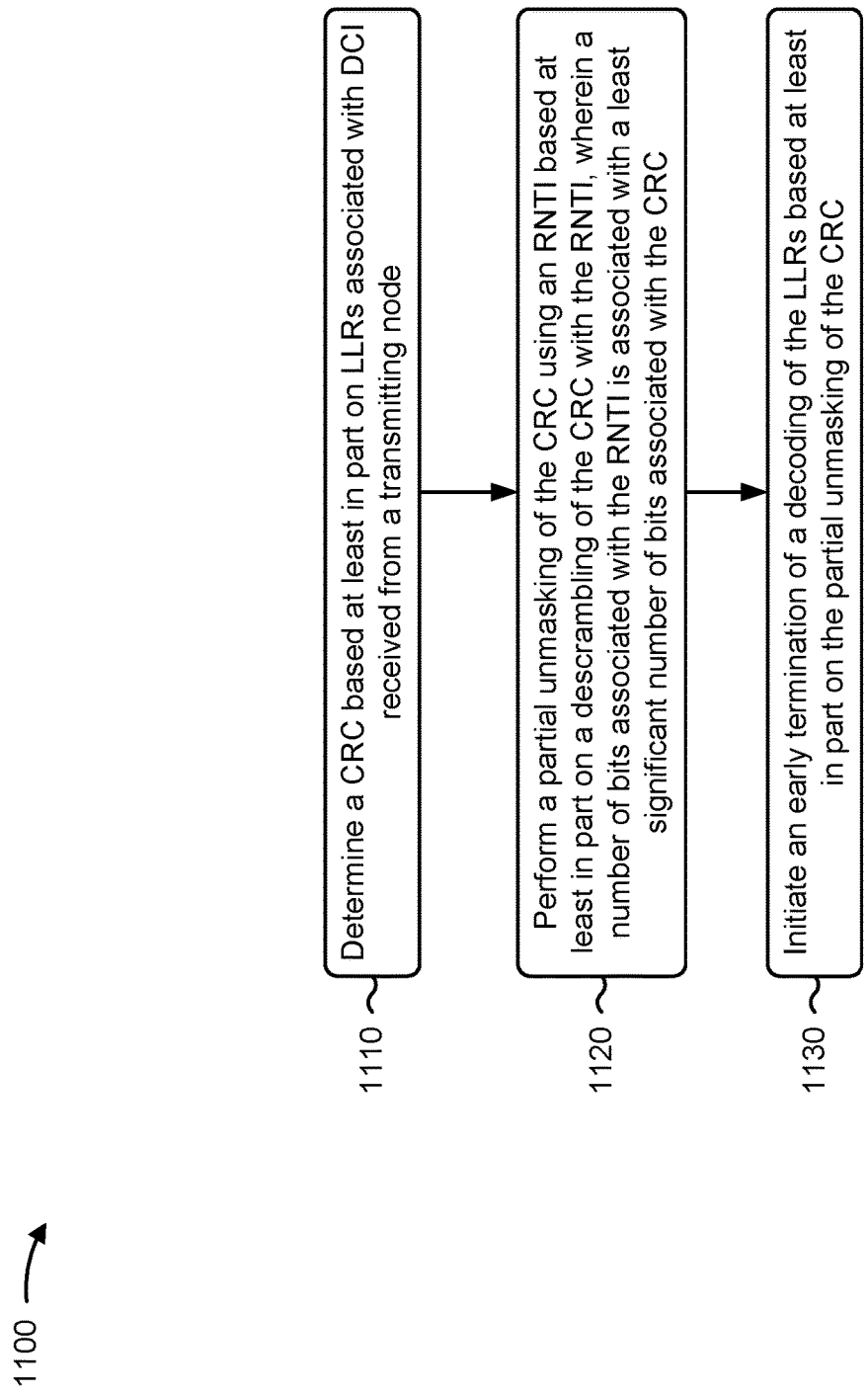

FIG. 11 is a diagram illustrating an example process 1100 performed, for example, by a receiving node, in accordance with the present disclosure. Example process 1100 is an example where the receiving node (e.g., UE 120) performs operations associated with techniques for masking and unmasking CRC bits for early termination of decoding.

As shown in FIG. 11, in some aspects, process 1100 may include determining a CRC based at least in part on LLRs associated with DCI received from a transmitting node (block 1110). For example, the receiving node (e.g., using communication manager 140 and/or determination component 1408, depicted in FIG. 14) may determine a CRC based at least in part on LLRs associated with DCI received from a transmitting node, as described above.

As further shown in FIG. 11, in some aspects, process 1100 may include performing a partial unmasking of the CRC using an RNTI based at least in part on a descrambling of the CRC with the RNTI, wherein a number of bits associated with the RNTI is associated with a least significant number of bits associated with the CRC (block 1120). For example, the receiving node (e.g., using communication manager 140 and/or performance component 1410, depicted in FIG. 14) may perform a partial unmasking of the CRC using an RNTI based at least in part on a descrambling of the CRC with the RNTI, wherein a number of bits associated with the RNTI is associated with a least significant number of bits associated with the CRC, as described above.

As further shown in FIG. 11, in some aspects, process 1100 may include initiating an early termination of a decoding of the LLRs based at least in part on the partial unmasking of the CRC (block 1130). For example, the receiving node (e.g., using communication manager 140 and/or initiation component 1412, depicted in FIG. 14) may initiate an early termination of a decoding of the LLRs based at least in part on the partial unmasking of the CRC, as described above.

Process 1100 may include additional aspects, such as any single aspect or any combination of aspects described below and/or in connection with one or more other processes described elsewhere herein.

In a first aspect, the CRC is an α-bit CRC, the number of bits associated with the RNTI is $\beta_1$ bits, and the least significant number of bits associated with the CRC is $\beta_1$ least significant bits of the α-bit CRC.

In a second aspect, alone or in combination with the first aspect, initiating the early termination of the decoding of the LLRs is based at least in part on an occurrence of a first RNTI-unmasked CRC bit, and an occurrence of a first non-RNTI unmasked CRC bit does not permit the early termination of the decoding of the LLRs until the occurrence of the first RNTI-unmasked CRC bit.

In a third aspect, alone or in combination with one or more of the first and second aspects, the first RNTI-unmasked CRC bit occurs prior to the first non-RNTI unmasked CRC bits based at least in part on the partial unmasking of the CRC using the least significant number of bits associated with the CRC.

In a fourth aspect, alone or in combination with one or more of the first through third aspects, initiating the early termination of the decoding of the LLRs is based at least in part on the DCI not being associated with the receiving node.

In a fifth aspect, alone or in combination with one or more of the first through fourth aspects, the early termination of the decoding based at least in part on the partial unmasking of the CRC reduces a number of decoding cycles, wherein the number of decoding cycles is based at least in part on a rate match size, a code block size, a payload size, and a rate match mode.

In a sixth aspect, alone or in combination with one or more of the first through fifth aspects, a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

In a seventh aspect, alone or in combination with one or more of the first through sixth aspects, the decoding of the LLRs and corresponding hard decision bits is performed serially or progressively using one of turbo decoding, LDPC decoding, or polar decoding.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
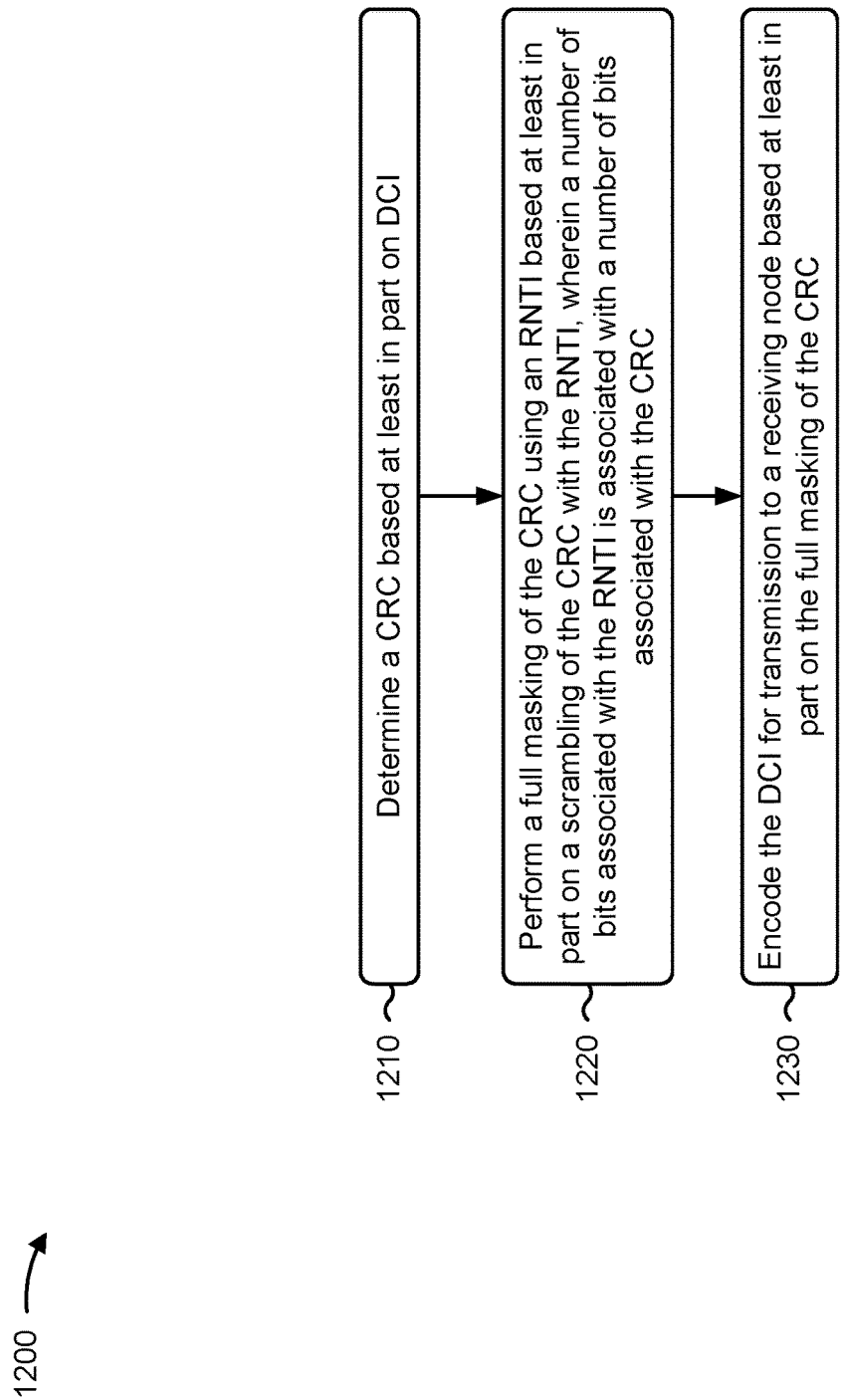

FIG. 12 is a diagram illustrating an example process 1200 performed, for example, by a transmitting node, in accordance with the present disclosure. Example process 1200 is an example where the transmitting node (e.g., base station 110) performs operations associated with techniques for masking and unmasking CRC bits for early termination of decoding.

As shown in FIG. 12, in some aspects, process 1200 may include determining a CRC based at least in part on DCI (block 1210). For example, the transmitting node (e.g., using communication manager 150 and/or determination component 1508, depicted in FIG. 15) may determine a CRC based at least in part on DCI, as described above.

As further shown in FIG. 12, in some aspects, process 1200 may include performing a full masking of the CRC using an RNTI based at least in part on a scrambling of the CRC with the RNTI, wherein a number of bits associated with the RNTI is associated with a number of bits associated with the CRC (block 1220). For example, the transmitting node (e.g., using communication manager 150 and/or performance component 1510, depicted in FIG. 15) may perform a full masking of the CRC using an RNTI based at least in part on a scrambling of the CRC with the RNTI, wherein a number of bits associated with the RNTI is associated with a number of bits associated with the CRC, as described above.

As further shown in FIG. 12, in some aspects, process 1200 may include encoding the DCI for transmission to a receiving node based at least in part on the full masking of the CRC (block 1230). For example, the transmitting node (e.g., using communication manager 150 and/or encoder component 1512, depicted in FIG. 15) may encode the DCI for transmission to a receiving node based at least in part on the full masking of the CRC, as described above.

Process 1200 may include additional aspects, such as any single aspect or any combination of aspects described below and/or in connection with one or more other processes described elsewhere herein.

In a first aspect, the CRC is an α-bit CRC, and the number of bits associated with the RNTI is β bits, where α is equal to β.

In a second aspect, alone or in combination with the first aspect, process 1200 includes obtaining the RNTI using an RNTI mapper function that receives an initial RNTI as an input and produces the RNTI as an output, wherein the number of bits associated with the RNTI is greater than a number of bits associated with the initial RNTI.

In a third aspect, alone or in combination with one or more of the first and second aspects, a most significant number of bits is taken from the initial RNTI and a number of zeros is padded to the most significant number of bits to produce the RNTI.

In a fourth aspect, alone or in combination with one or more of the first through third aspects, the most significant number of bits taken from the initial RNTI is μ bits, and the number of zeros padded to a resulting μ-bit value is $\beta_1$ zeros to produce the RNTI including α bits, where $\mu+\beta_1=\alpha$.

In a fifth aspect, alone or in combination with one or more of the first through fourth aspects, the RNTI is associated with the number of bits associated with the CRC for a purpose of RNTI masking of the CRC for a downlink control channel processing, and an initial RNTI is associated with a number of bits that is less than the number of bits associated with the CRC for non-CRC masking purposes.

In a sixth aspect, alone or in combination with one or more of the first through fifth aspects, the encoding of the DCI is a polar encoding.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
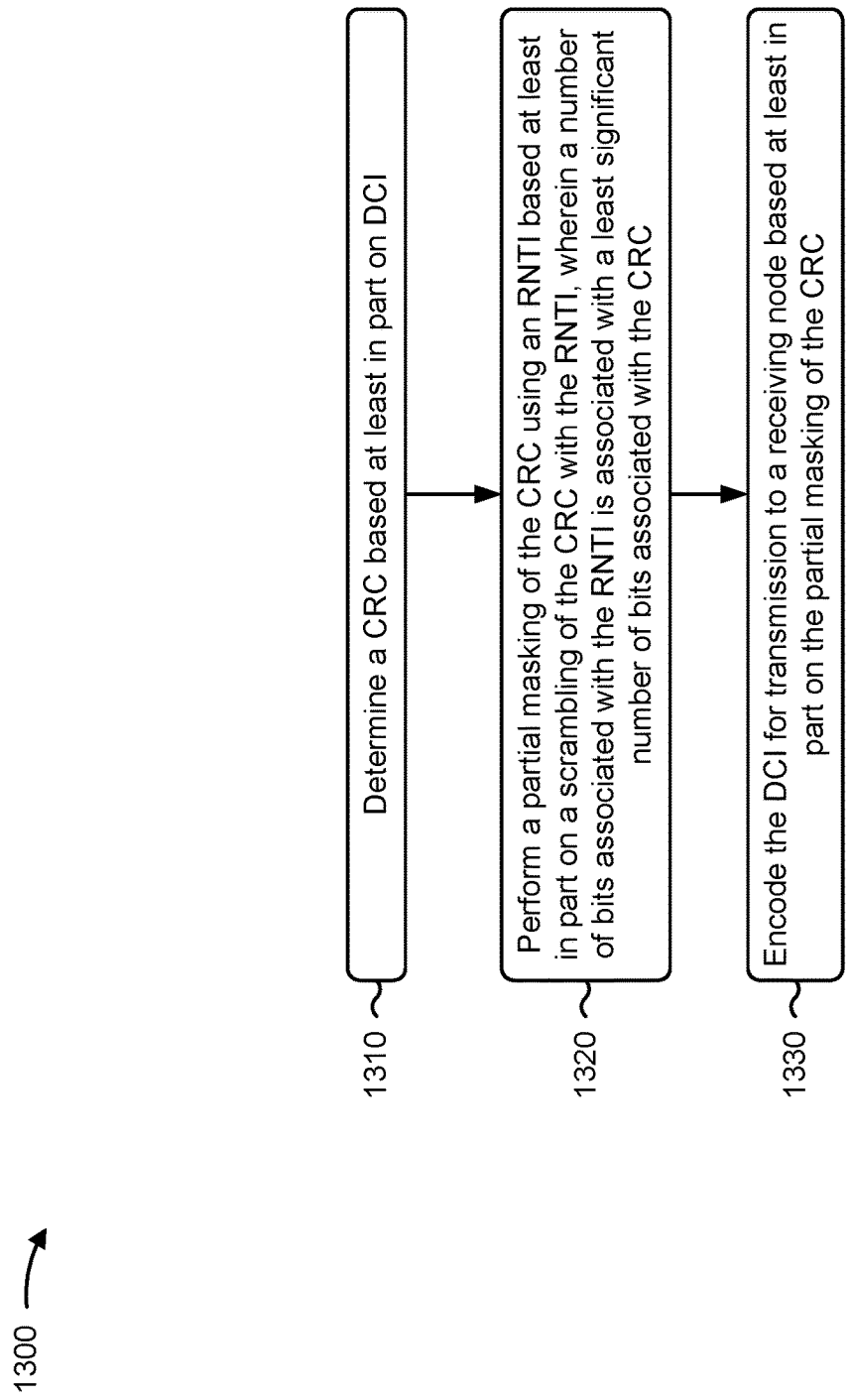

FIG. 13 is a diagram illustrating an example process 1300 performed, for example, by a transmitting node, in accordance with the present disclosure. Example process 1300 is an example where the transmitting node (e.g., base station 110) performs operations associated with techniques for masking and unmasking CRC bits for early termination of decoding.

As shown in FIG. 13, in some aspects, process 1300 may include determining a CRC based at least in part on DCI (block 1310). For example, the transmitting node (e.g., using communication manager 150 and/or determination component 1508, depicted in FIG. 15) may determine a CRC based at least in part on DCI, as described above.

As further shown in FIG. 13, in some aspects, process 1300 may include performing a partial masking of the CRC using an RNTI based at least in part on a scrambling of the CRC with the RNTI, wherein a number of bits associated with the RNTI is associated with a least significant number of bits associated with the CRC (block 1320). For example, the transmitting node (e.g., using communication manager 150 and/or performance component 1510, depicted in FIG. 15) may perform a partial masking of the CRC using an RNTI based at least in part on a scrambling of the CRC with the RNTI, wherein a number of bits associated with the RNTI is associated with a least significant number of bits associated with the CRC, as described above.

As further shown in FIG. 13, in some aspects, process 1300 may include encoding the DCI for transmission to a receiving node based at least in part on the partial masking of the CRC (block 1330). For example, the transmitting node (e.g., using communication manager 150 and/or encoder component 1512, depicted in FIG. 15) may encode the DCI for transmission to a receiving node based at least in part on the partial masking of the CRC, as described above.

Process 1300 may include additional aspects, such as any single aspect or any combination of aspects described below and/or in connection with one or more other processes described elsewhere herein.

In a first aspect, the CRC is an $\alpha$-bit CRC, the number of bits associated with the RNTI is $\beta_1$ bits, and the least significant number of bits associated with the CRC is $\beta_1$ least significant bits of the $\alpha$-bit CRC.

In a second aspect, alone or in combination with the first aspect, the encoding of the DCI is a polar encoding.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
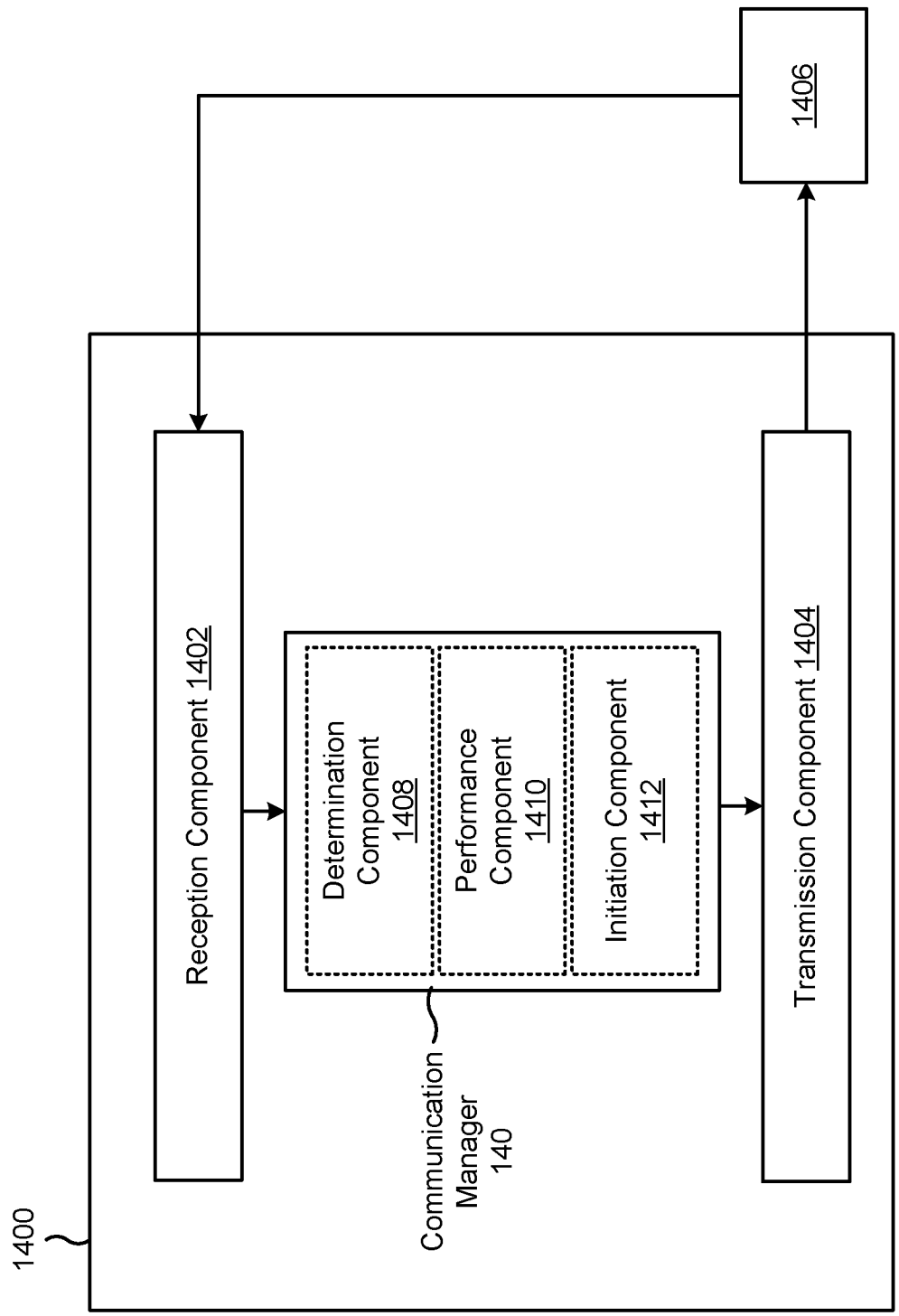
FIGS. 14-15 are block diagrams of example apparatuses for wireless communication, in accordance with the present disclosure.

FIG. 14 is a block diagram of an example apparatus 1400 for wireless communication. The apparatus 1400 may be a receiving node, or a receiving node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1100 may include the communication manager 140. The communication manager 140) may include one or more of a determination component 1408, a performance component 1410, or an initiation component 1412, among other examples.

In some aspects, the apparatus 1400 may be configured to perform one or more operations described herein in connection with FIGS. 6-9. Additionally, or alternatively, the apparatus 1400 may be configured to perform one or more processes described herein, such as process 1000 of FIG. 10, process 1100 of FIG. 11, or a combination thereof. In some aspects, the apparatus 1400 and/or one or more components shown in FIG. 14 may include one or more components of the receiving node described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the receiving node described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the receiving node described above in connection with FIG. 2. In some aspects, the transmission component 1404 may be co-located with the reception component 1602 in a transceiver.

The determination component 1408 may determine a CRC based at least in part on LLRs associated with DCI received from a transmitting node. The performance component 1410 may perform a full unmasking of the CRC using an RNTI based at least in part on a descrambling of the CRC with the RNTI, wherein a number of bits associated with the RNTI is associated with a number of bits associated with the CRC. The initiation component 1412 may initiate an early termination of a decoding of the LLRs based at least in part on the full unmasking of the CRC.

The determination component 1408 may determine a CRC based at least in part on LLRs associated with DCI received from a transmitting node. The performance component 1410 may perform a partial unmasking of the CRC using an RNTI based at least in part on a descrambling of the CRC with the RNTI, wherein a number of bits associated with the RNTI is associated with a least significant number of bits associated with the CRC. The initiation component 1412 may initiate an early termination of a decoding of the LLRs based at least in part on the partial unmasking of the CRC.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
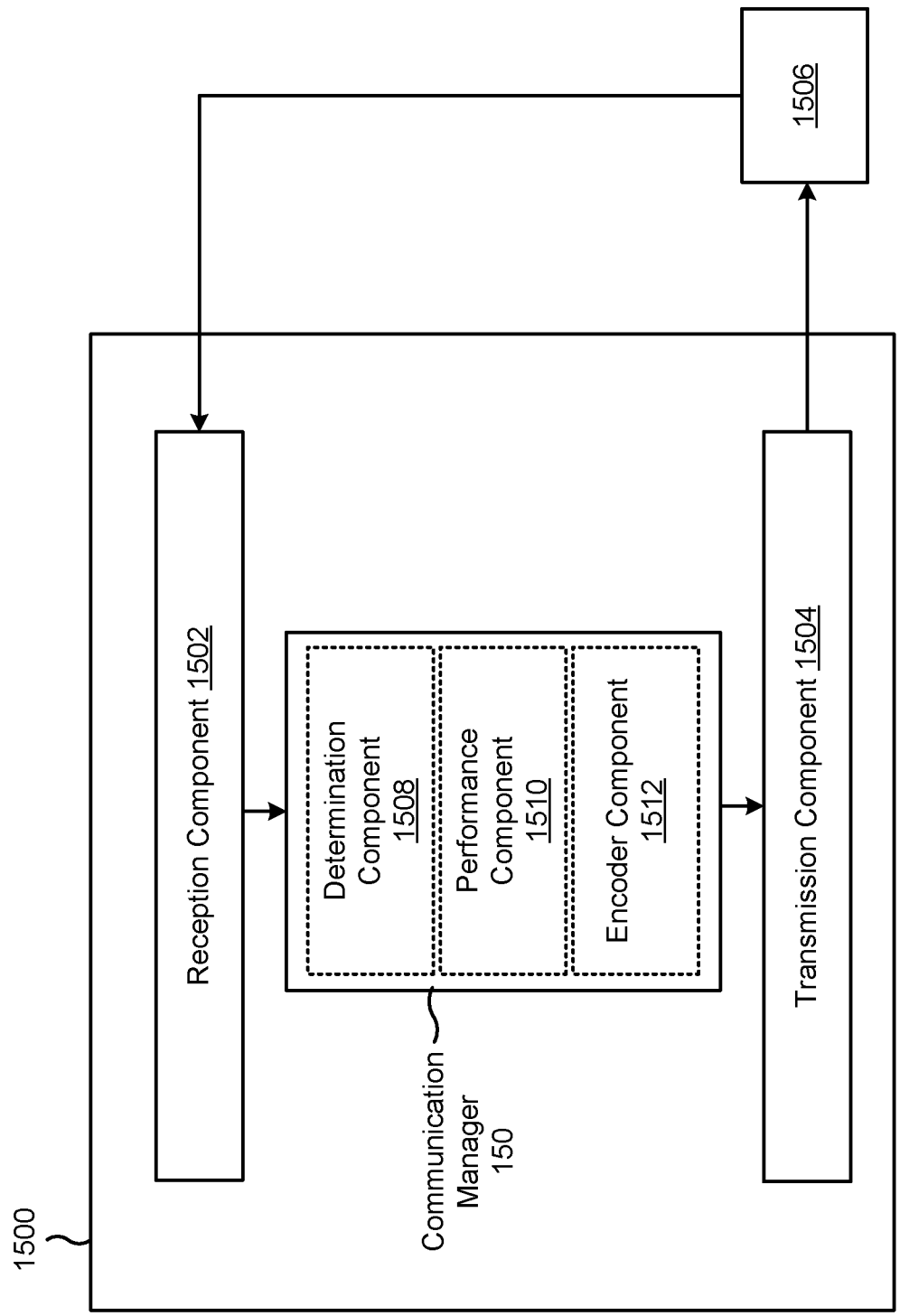

FIG. 15 is a block diagram of an example apparatus 1500 for wireless communication. The apparatus 1500 may be a transmitting node, or a transmitting node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1100 may include the communication manager 150. The communication manager 150) may include one or more of a determination component 1508, a performance component 1510, or an encoder component 1512, among other examples.

In some aspects, the apparatus 1500 may be configured to perform one or more operations described herein in connection with FIGS. 6-9. Additionally, or alternatively, the apparatus 1500 may be configured to perform one or more processes described herein, such as process 1200 of FIG. 12, process 1300 of FIG. 13, or a combination thereof. In some aspects, the apparatus 1500 and/or one or more components shown in FIG. 15 may include one or more components of the transmitting node described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the transmitting node described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the transmitting node described above in connection with FIG. 2. In some aspects, the transmission component 1504 may be co-located with the reception component 1502 in a transceiver.

The determination component 1508 may determine a CRC based at least in part on DCI. The performance component 1510 may perform a full masking of the CRC using an RNTI based at least in part on a scrambling of the CRC with the RNTI, wherein a number of bits associated with the RNTI is associated with a number of bits associated with the CRC. The encoder component 1512 may encode the DCI for transmission to a receiving node based at least in part on the full masking of the CRC.

The determination component 1508 may determine a CRC based at least in part on DCI. The performance component 1510 may perform a partial masking of the CRC using an RNTI based at least in part on a scrambling of the CRC with the RNTI, wherein a number of bits associated with the RNTI is associated with a least significant number of bits associated with the CRC. The encoder component 1512 may encode the DCI for transmission to a receiving node based at least in part on the partial masking of the CRC.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a receiving node, comprising: determining a cyclic redundancy check (CRC) based at least in part on log-likelihood ratios (LLRs) associated with downlink control information (DCI) received from a transmitting node; performing a full unmasking of the CRC using a radio network temporary identifier (RNTI) based at least in part on a descrambling of the CRC with the RNTI, wherein a number of bits associated with the RNTI is associated with a number of bits associated with the CRC; and initiating an early termination of a decoding of the LLRs based at least in part on the full unmasking of the CRC.

Aspect 2: The method of Aspect 1, wherein the CRC is an α-bit CRC, and the number of bits associated with the RNTI is β bits, where α is equal to β.

Aspect 3: The method of any of Aspects 1 through 2, further comprising: obtaining the RNTI using an RNTI mapper function that receives an initial RNTI as an input and produces the RNTI as an output, wherein the number of bits associated with the RNTI is greater than a number of bits associated with the initial RNTI.

Aspect 4: The method of Aspect 3, wherein a most significant number of bits is taken from the initial RNTI and a number of zeros is padded to the most significant number of bits to produce the RNTI.

Aspect 5: The method of Aspect 4, wherein the most significant number of bits taken from the initial RNTI is μ bits, and the number of zeros padded to a resulting μ-bit value is $β_1$ zeros to produce the RNTI including α bits, where $μ+β_1=α$.

Aspect 6: The method of any of Aspects 1 through 5, wherein initiating the early termination of the decoding of the LLRs is based at least in part on an occurrence of a first RNTI-unmasked CRC bit, and wherein an occurrence of a first non-RNTI unmasked CRC bit does not permit the early termination of the decoding of the LLRs until the occurrence of the first RNTI-unmasked CRC bit.

Aspect 7: The method of Aspect 6, wherein the first RNTI-unmasked CRC bit occurs prior to non-RNTI unmasked CRC bits based at least in part on the full unmasking of the CRC.

Aspect 8: The method of any of Aspects 1 through 7, wherein initiating the early termination of the decoding of the LLRs is based at least in part on the DCI not being associated with the receiving node.

Aspect 9: The method of any of Aspects 1 through 8, wherein the RNTI is associated with the number of bits associated with the CRC for a purpose of RNTI unmasking of the CRC for a downlink control channel processing, and an initial RNTI is associated with a number of bits that is less than the number of bits associated with the CRC for non-CRC unmasking purposes.

Aspect 10: The method of any of Aspects 1 through 9, wherein the early termination of the decoding based at least in part on the full unmasking of the CRC reduces a number of decoding cycles, wherein the number of decoding cycles is based at least in part on a rate match size, a code block size, a payload size, and a rate match mode.

Aspect 11: The method of any of Aspects 1 through 10, wherein a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

Aspect 12: The method of any of Aspects 1 through 11, wherein the decoding of the LLRs and corresponding hard decision bits is performed serially or progressively using one of turbo decoding, low-density parity-check decoding, or polar decoding.

Aspect 13: A method of wireless communication performed by a receiving node, comprising: determining a cyclic redundancy check (CRC) based at least in part on log-likelihood ratios (LLRs) associated with downlink control information (DCI) received from a transmitting node; performing a partial unmasking of the CRC using a radio network temporary identifier (RNTI) based at least in part on a descrambling of the CRC with the RNTI, wherein a number of bits associated with the RNTI is associated with a least significant number of bits associated with the CRC; and initiating an early termination of a decoding of the LLRs based at least in part on the partial unmasking of the CRC.

Aspect 14: The method of Aspect 13, wherein the CRC is an α-bit CRC, the number of bits associated with the RNTI is $β_1$ bits, and the least significant number of bits associated with the CRC is $β_1$ least significant bits of the α-bit CRC.

Aspect 15: The method of any of Aspects 13 through 14, wherein initiating the early termination of the decoding of the LLRs is based at least in part on an occurrence of a first RNTI-unmasked CRC bit, and wherein an occurrence of a first non-RNTI unmasked CRC bit does not permit the early termination of the decoding of the LLRs until the occurrence of the first RNTI-unmasked CRC bit.

Aspect 16: The method of Aspect 15, wherein the first RNTI-unmasked CRC bit occurs prior to the first non-RNTI unmasked CRC bits based at least in part on the partial unmasking of the CRC using the least significant number of bits associated with the CRC.

Aspect 17: The method of any of Aspects 13 through 16, wherein initiating the early termination of the decoding of the LLRs is based at least in part on the DCI not being associated with the receiving node.

Aspect 18: The method of any of Aspects 13 through 17, wherein the early termination of the decoding based at least in part on the partial unmasking of the CRC reduces a number of decoding cycles, wherein the number of decoding cycles is based at least in part on a rate match size, a code block size, a payload size, and a rate match mode.

Aspect 19: The method of any of Aspects 13 through 18, wherein a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

Aspect 20: The method of any of Aspects 13 through 19, wherein the decoding of the LLRs and corresponding hard decision bits is performed serially or progressively using one of turbo decoding, low-density parity-check decoding, or polar decoding.

Aspect 21: A method of wireless communication performed by a transmitting node, comprising: determining a cyclic redundancy check (CRC) based at least in part on downlink control information (DCI); performing a full masking of the CRC using a radio network temporary identifier (RNTI) based at least in part on a scrambling of the CRC with the RNTI, wherein a number of bits associated with the RNTI is associated with a number of bits associated with the CRC; and encoding the DCI for transmission to a receiving node based at least in part on the full masking of the CRC.

Aspect 22: The method of Aspect 21, wherein the CRC is an α-bit CRC, and the number of bits associated with the RNTI is β bits, where α is equal to β.

Aspect 23: The method of any of Aspects 21 through 22, further comprising: obtaining the RNTI using an RNTI mapper function that receives an initial RNTI as an input and produces the RNTI as an output, wherein the number of bits associated with the RNTI is greater than a number of bits associated with the initial RNTI.

Aspect 24: The method of Aspect 23, wherein a most significant number of bits is taken from the initial RNTI and a number of zeros is padded to the most significant number of bits to produce the RNTI.

Aspect 25: The method of Aspect 24, wherein the most significant number of bits taken from the initial RNTI is μ bits, and the number of zeros padded to a resulting µ-bit value is $\beta_1$ zeros to produce the RNTI including $\alpha$ bits, where $\mu+\beta_1=\alpha$.

Aspect 26: The method of any of Aspects 21 through 25, wherein the RNTI is associated with the number of bits associated with the CRC for a purpose of RNTI masking of the CRC for a downlink control channel processing, and an initial RNTI is associated with a number of bits that is less than the number of bits associated with the CRC for non-CRC masking purposes.

Aspect 27: The method of any of Aspects 21 through 26, wherein the encoding of the DCI is a polar encoding.

Aspect 28: A method of wireless communication performed by a transmitting node, comprising: determining a cyclic redundancy check (CRC) based at least in part on downlink control information (DCI); performing a partial masking of the CRC using a radio network temporary identifier (RNTI) based at least in part on a scrambling of the CRC with the RNTI, wherein a number of bits associated with the RNTI is associated with a least significant number of bits associated with the CRC; and encoding the DCI for transmission to a receiving node based at least in part on the partial masking of the CRC.

Aspect 29: The method of Aspect 28, wherein the CRC is an $\alpha$-bit CRC, the number of bits associated with the RNTI is $\beta_1$ bits, and the least significant number of bits associated with the CRC is $\beta_1$ least significant bits of the $\alpha$-bit CRC.

Aspect 30: The method of any of Aspects 28 through 29, wherein the encoding of the DCI is a polar encoding.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the memory and the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a receiving node, comprising:
    determining a cyclic redundancy check (CRC) based at least in part on log-likelihood ratios (LLRs) associated with downlink control information (DCI) received from a transmitting node;
    performing a full unmasking of the CRC using a radio network temporary identifier (RNTI) based at least in part on a descrambling of the CRC with the RNTI, wherein a number of bits associated with the RNTI is associated with a number of bits associated with the CRC; and
    initiating an early termination of a decoding of the LLRs based at least in part on the full unmasking of the CRC.
2. The method of claim 1, wherein the CRC is an $\alpha$-bit CRC, and the number of bits associated with the RNTI is $\beta$ bits, where $\alpha$ is equal to $\beta$.

3. The method of claim 1, further comprising:
obtaining the RNTI using an RNTI mapper function that receives an initial RNTI as an input and produces the RNTI as an output, wherein the number of bits associated with the RNTI is greater than a number of bits associated with the initial RNTI.

4. The method of claim 3, wherein a most significant number of bits is taken from the initial RNTI and a number of zeros is padded to the most significant number of bits to produce the RNTI.

5. The method of claim 4, wherein the most significant number of bits taken from the initial RNTI is $\mu$ bits, and the number of zeros padded to a resulting $\mu$-bit value is $\beta_1$ zeros to produce the RNTI including $\alpha$ bits, where $\mu+\beta_1=\alpha$.

6. The method of claim 1, wherein initiating the early termination of the decoding of the LLRs is based at least in part on an occurrence of a first RNTI-unmasked CRC bit, and wherein an occurrence of a first non-RNTI unmasked CRC bit does not permit the early termination of the decoding of the LLRs until the occurrence of the first RNTI-unmasked CRC bit.

7. The method of claim 6, wherein the first RNTI-unmasked CRC bit occurs prior to non-RNTI unmasked CRC bits based at least in part on the full unmasking of the CRC.

8. The method of claim 1, wherein initiating the early termination of the decoding of the LLRs is based at least in part on the DCI not being associated with the receiving node.

9. The method of claim 1, wherein the RNTI is associated with the number of bits associated with the CRC for a purpose of RNTI unmasking of the CRC for a downlink control channel processing, and an initial RNTI is associated with a number of bits that is less than the number of bits associated with the CRC for non-CRC unmasking purposes.

10. The method of claim 1, wherein the early termination of the decoding based at least in part on the full unmasking of the CRC reduces a number of decoding cycles, wherein the number of decoding cycles is based at least in part on a rate match size, a code block size, a payload size, and a rate match mode.

11. The method of claim 1, wherein a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

12. The method of claim 1, wherein the decoding of the LLRs and corresponding hard decision bits is performed serially or progressively using one of turbo decoding, low-density parity-check decoding, or polar decoding.

13. A method of wireless communication performed by a receiving node, comprising:
determining a cyclic redundancy check (CRC) based at least in part on log-likelihood ratios (LLRs) associated with downlink control information (DCI) received from a transmitting node;
performing a partial unmasking of the CRC using a radio network temporary identifier (RNTI) based at least in part on a descrambling of the CRC with the RNTI, wherein a number of bits associated with the RNTI is associated with a least significant number of bits associated with the CRC; and
initiating an early termination of a decoding of the LLRs based at least in part on the partial unmasking of the CRC.

14. The method of claim 13, wherein the CRC is an $\alpha$-bit CRC, the number of bits associated with the RNTI is $\beta_1$ bits, and the least significant number of bits associated with the CRC is $\beta_1$ least significant bits of the $\alpha$-bit CRC.

15. The method of claim 13, wherein initiating the early termination of the decoding of the LLRs is based at least in part on an occurrence of a first RNTI-unmasked CRC bit, and wherein an occurrence of a first non-RNTI unmasked CRC bit does not permit the early termination of the decoding of the LLRs until the occurrence of the first RNTI-unmasked CRC bit.

16. The method of claim 15, wherein the first RNTI-unmasked CRC bit occurs prior to the first non-RNTI unmasked CRC bits based at least in part on the partial unmasking of the CRC using the least significant number of bits associated with the CRC.

17. The method of claim 13, wherein initiating the early termination of the decoding of the LLRs is based at least in part on the DCI not being associated with the receiving node.

18. The method of claim 13, wherein the early termination of the decoding based at least in part on the partial unmasking of the CRC reduces a number of decoding cycles, wherein the number of decoding cycles is based at least in part on a rate match size, a code block size, a payload size, and a rate match mode.

19. The method of claim 13, wherein a CRC computation, an RNTI unmasking, and a CRC check are performed on-the-fly along with the decoding of the LLRs to reduce decoding cycles as compared to performing the CRC computation, the RNTI unmasking, and the CRC check after the decoding.

20. The method of claim 13, wherein the decoding of the LLRs and corresponding hard decision bits is performed serially or progressively using one of turbo decoding, low-density parity-check decoding, or polar decoding.

21. A method of wireless communication performed by a transmitting node, comprising:
determining a cyclic redundancy check (CRC) based at least in part on downlink control information (DCI);
performing a full masking of the CRC using a radio network temporary identifier (RNTI) based at least in part on a scrambling of the CRC with the RNTI, wherein a number of bits associated with the RNTI is associated with a number of bits associated with the CRC; and
encoding the DCI for transmission to a receiving node based at least in part on the full masking of the CRC.

22. The method of claim 21, wherein the CRC is an $\alpha$-bit CRC, and the number of bits associated with the RNTI is $\beta$ bits, where $\alpha$ is equal to $\beta$.

23. The method of claim 21, further comprising:
obtaining the RNTI using an RNTI mapper function that receives an initial RNTI as an input and produces the RNTI as an output, wherein the number of bits associated with the RNTI is greater than a number of bits associated with the initial RNTI.

24. The method of claim 23, wherein a most significant number of bits is taken from the initial RNTI and a number of zeros is padded to the most significant number of bits to produce the RNTI.

25. The method of claim 24, wherein the most significant number of bits taken from the initial RNTI is $\mu$ bits, and the number of zeros padded to a resulting $\mu$-bit value is $\beta_1$ zeros to produce the RNTI including $\alpha$ bits, where $\mu+\beta_1=\alpha$.

26. The method of claim 21, wherein the RNTI is associated with the number of bits associated with the CRC for a purpose of RNTI masking of the CRC for a downlink control channel processing, and an initial RNTI is associated with a number of bits that is less than the number of bits associated with the CRC for non-CRC masking purposes.

27. The method of claim 21, wherein the encoding of the DCI is a polar encoding.

28. A method of wireless communication performed by a transmitting node, comprising:
- determining a cyclic redundancy check (CRC) based at least in part on downlink control information (DCI);
- performing a partial masking of the CRC using a radio network temporary identifier (RNTI) based at least in part on a scrambling of the CRC with the RNTI, wherein a number of bits associated with the RNTI is associated with a least significant number of bits associated with the CRC; and
- encoding the DCI for transmission to a receiving node based at least in part on the partial masking of the CRC.

29. The method of claim 28, wherein the CRC is an $\alpha$-bit CRC, the number of bits associated with the RNTI is $\beta_1$ bits, and the least significant number of bits associated with the CRC is $\beta_1$ least significant bits of the $\alpha$-bit CRC.

30. The method of claim 28, wherein the encoding of the DCI is a polar encoding.

\* \* \* \* \*